(12) United States Patent
Kashiwagi

(10) Patent No.: US 11,256,125 B2
(45) Date of Patent: Feb. 22, 2022

(54) OPTICAL SHEET, IMAGE SOURCE UNIT AND IMAGE DISPLAY DEVICE

(71) Applicant: DAI NIPPON PRINTING CO., LTD., Tokyo-to (JP)

(72) Inventor: Tsuyoshi Kashiwagi, Tokyo-to (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 0 days.

(21) Appl. No.: 16/522,431

(22) Filed: Jul. 25, 2019

(65) Prior Publication Data
US 2019/0346716 A1     Nov. 14, 2019

Related U.S. Application Data

(63) Continuation-in-part of application No. 15/041,893, filed on Feb. 11, 2016.

(30) Foreign Application Priority Data

Feb. 16, 2015  (JP) .................................. 2015-027857
Feb. 18, 2015  (JP) .................................. 2015-029903

(51) Int. Cl.
*G02F 1/1335*      (2006.01)

(52) U.S. Cl.
CPC .. *G02F 1/133512* (2013.01); *G02F 1/133504* (2013.01); *G02F 1/133536* (2013.01); *G02F 1/133553* (2013.01); *G02F 1/133567* (2021.01)

(58) Field of Classification Search
CPC .............. G02B 6/0051; G02B 5/0231; G02B 5/0236–0278; G02F 2001/133507; G02F 1/133606; G02F 1/133504
See application file for complete search history.

(56) References Cited

U.S. PATENT DOCUMENTS 7,474,463 B2    1/2009   Katsura et al.
2006/0103779 A1*  5/2006   Amemiya ......... G02F 1/133524
                                                   349/95

(Continued)

FOREIGN PATENT DOCUMENTS

JP      9-169613      6/1997
JP      9-255516      9/1997

(Continued)

OTHER PUBLICATIONS

Notice of Allowance, U.S. Appl. No. 15/041,893, dated Jul. 18, 2019 (10 pages).

(Continued)

*Primary Examiner* — Michael H Caley
*Assistant Examiner* — Jonathan Y Jung
(74) *Attorney, Agent, or Firm* — Hamre, Schumann, Mueller & Larson, P.C.

(57) ABSTRACT

A laminate includes: a substrate layer; and an optical function layer that is layered on one surface of the substrate layer, and has a plurality of light transmission parts which are arranged in a row along a surface of the substrate layer so as to be light-transmissive, and light absorption parts in a row, each of which is arranged between adjacent ones of the light transmission parts so as to be light-absorptive, wherein on a cross section of the optical function layer in the layer thickness direction, a cross-sectional area of one of the light transmission parts to the total cross-sectional area of one of the light transmission parts and one of the light absorption parts which are adjacent to each other is 78.2% to 88.5%, and optical diffuse reflectances thereof satisfy predetermined values.

15 Claims, 21 Drawing Sheets

(56) References Cited

U.S. PATENT DOCUMENTS

| | | | |
|---|---|---|---|
| 2006/0245060 A1* | 11/2006 | Goto | G02B 5/003 359/613 |
| 2007/0153377 A1 | 7/2007 | Goto | |
| 2009/0033222 A1 | 2/2009 | Park et al. | |
| 2009/0091919 A1* | 4/2009 | Goto | G02F 1/133603 362/97.1 |
| 2010/0271721 A1 | 10/2010 | Gaides et al. | |
| 2011/0170194 A1* | 7/2011 | Kashiwagi | G02B 5/0278 359/599 |
| 2014/0204464 A1* | 7/2014 | Halverson | G02F 1/133524 359/599 |

FOREIGN PATENT DOCUMENTS

| | | |
|---|---|---|
| JP | 2006-171700 | 6/2006 |
| JP | 2009-058660 | 3/2009 |
| JP | 2010-217871 | 9/2010 |
| JP | 2011-508262 | 3/2011 |
| JP | 2012-150492 | 8/2012 |
| JP | 2012-530938 | 12/2012 |
| JP | 2014-063106 | 4/2014 |
| WO | 2010/148082 | 12/2010 |

OTHER PUBLICATIONS

Advisory Action, U.S. Appl. No. 15/812,549, dated Feb. 10, 2020 (4 pages).
Office Action, U.S. Appl. No. 15/812,549, dated May 15, 2020 (16 pages).
Office Action, U.S. Appl. No. 16/656,017, dated Apr. 29, 2020 (12 pages).
Office Action, U.S. Appl. No. 16/680,777, dated Apr. 29, 2020 (10 pages).
Notice of Allowance, U.S. Appl. No. 15/041,893, dated Feb. 10, 2020 (11 pages).
Office Action, U.S. Appl. No. 15/041,893, dated Jun. 12, 2020 (18 pages).
Final Office Action, U.S. Appl. No. 15/041,893, dated Jan. 14, 2021 (21 pages).
Final Office Action, U.S. Appl. No. 15/812,549, dated Dec. 30, 2020 (16 pages).
Final Office Action, U.S. Appl. No. 16/656,017, dated Dec. 16, 2020 (17 pages).
Final Office Action, U.S. Appl. No. 16/680,777, dated Dec. 30, 2020 (13 pages).
U.S. Appl. No. 16/680,777, filed Nov. 12, 2019.
U.S. Appl. No. 15/812,549, filed Nov. 14, 2017.
U.S. Appl. No. 16/656,017, filed Oct. 17, 2019.

* cited by examiner

OPTICAL SHEET, IMAGE SOURCE UNIT AND IMAGE DISPLAY DEVICE

TECHNICAL FIELD

The present invention relates to optical sheets that control light emitted by light sources, to emit the light in observer sides, and image source units and image display devices that include the optical sheets.

BACKGROUND ART

Light sources and optical sheets are included in image display devices that emit images to observers, like liquid crystal displays, rear projection display devices, display devices using organic electroluminescence, and field emission displays (FEDs). Such an optical sheet is composed of a plurality of layers that have various functions for improving the quality of light emitted by the light source to offer the light to observers.

For example, such an optical sheet is disclosed in each of WO2010/148082 and JP 2010-217871 A.

The optical sheet (light control film) of WO2010/148082 has transmissive regions that are arranged in a row along a sheet surface so as to be light-transmissive, and absorptive regions that are arranged in a row, each of which is between transmissive regions, so as to be light-absorptive. It is disclosed that a width at the narrowest region of a transmissive region and pitch of transmissive regions have a certain relationship.

The optical sheet of JP 2010-217871 A includes an optical functional sheet layer that has prisms arranged in a row along a sheet surface so as to be light-transmissive, and light absorption parts arranged in a row, each of which is between prisms, so as to be light-absorptive. Thereby, an image light and outside light are reflected and absorbed, to improve the quality of the image light.

Here, interference fringes and scintillation (so-called glare) are sometimes generated in such an optical sheet, originating from a mode of arrangement of light absorption parts and light transmission parts alternately in a stripe pattern, light concentration due to control of the light, a mode of contact interfaces with other layers, etc. For this generation, JP 2010-217871 A discloses that a surface of a base film is prepared to be a rough surface of no less than 0.1 μm in mean roughness (Ra), so that interference fringes can disappear.

SUMMARY OF INVENTION

Technical Problem

Having such a light absorption part (absorptive region) makes it possible to absorb light that causes something bad, at the light absorption part to have a proper light blocking effect. "Light blocking effect" means performance in light control in a desired direction. A high light blocking effect makes it possible to control light, not to be emitted in a predetermined direction. In contrast however, there is a problem that efficiency of light utilization deteriorates because light is absorbed. While the art as WO2010/148082 is disclosed, conventional arts are not necessarily satisfying in view of having a light blocking effect beyond a certain level and obtaining high efficiency of light utilization.

Although the generation of interference fringes can be prevented by providing a rough surface of no less than 0.1 μm in Ra as and JP 2010-217871 A, there sometimes arises a problem that a light blocking effect that is a basic effect of optical sheets deteriorates.

In view of the above problems, an object of the present invention is to provide an optical sheet that makes it possible to keep efficiency of light utilization high or to prevent something bad from occurring in a screen like interference fringes, while having a light blocking effect. In addition, the present invention provides an image source unit and an image display device each including the optical sheet.

Solution to Problem

One aspect of the present disclosure is a laminate having a plurality of layers, the laminate comprising: a substrate layer; and an optical function layer that is layered on one surface of the substrate layer, and has a plurality of light transmission parts which are arranged in a row along a surface of the substrate layer so as to be light-transmissive, and light absorption parts in a row, each of which is arranged between adjacent ones of the light transmission parts so as to be light-absorptive, wherein on a cross section of the optical function layer in a layer thickness direction, a cross-sectional area of one of the light transmission parts to a total cross-sectional area of one of the light transmission parts and one of the light absorption parts which are adjacent to each other is 78.2% to 88.5%, and when irradiation light inclining at 45° from a normal line of the optical function layer is irradiated in a direction of alternately aligning the light transmission parts and the light absorbing parts of the optical function layer, and omnidirectional light when 45° specular reflected light is excluded from reflected light of this irradiation light is defined as an optical diffuse reflectance, an optical diffuse reflectance on a light output surface side of the laminate is 1.9% to 3.5%. An optical diffuse reflectance on a light input surface side of the laminate may be 2.5% to 5.0%.

Another aspect of the present disclosure is a laminate having a plurality of layers, the laminate comprising: a substrate layer; an optical function layer that is layered on one surface of the substrate layer, and has a plurality of light transmission parts which are arranged in a row along a surface of the substrate layer so as to be light-transmissive, and light absorption parts in a row, each of which is arranged between adjacent ones of the light transmission parts so as to be light-absorptive; and a reflective polarizing plate that is arranged on the optical function layer on a side opposite to the substrate layer, wherein on a cross section of the optical function layer in a layer thickness direction, a cross-sectional area of one of the light transmission parts to a total cross-sectional area of one of the light transmission parts and one of the light absorption parts which are adjacent to each other is 78.2% to 88.5%, and when irradiation light inclining at 45° from a normal line of the optical function layer is irradiated in a direction of alternately aligning the light transmission parts and the light absorbing parts of the optical function layer, and omnidirectional light when 45° specular reflected light is excluded from reflected light of this irradiation light is defined as an optical diffuse reflectance, an optical diffuse reflectance on a light input surface side of the laminate is 8.2% to 9.7%.

In the laminate, a cross section of each of the light transmission parts in the layer thickness direction may be a trapezoid.

Provided is an image source unit comprising a liquid crystal panel that is arranged on a light output side of the laminate.

Also provided is an image display device comprising: a housing; and the image source unit that is arranged inside the housing.

Advantageous Effects of Invention

The optical sheet makes it possible to keep efficiency of light utilization high or to prevent something bad from occurring in a screen like interference fringes, while having a light blocking effect.

DESCRIPTION OF EMBODIMENTS

Figure 1:
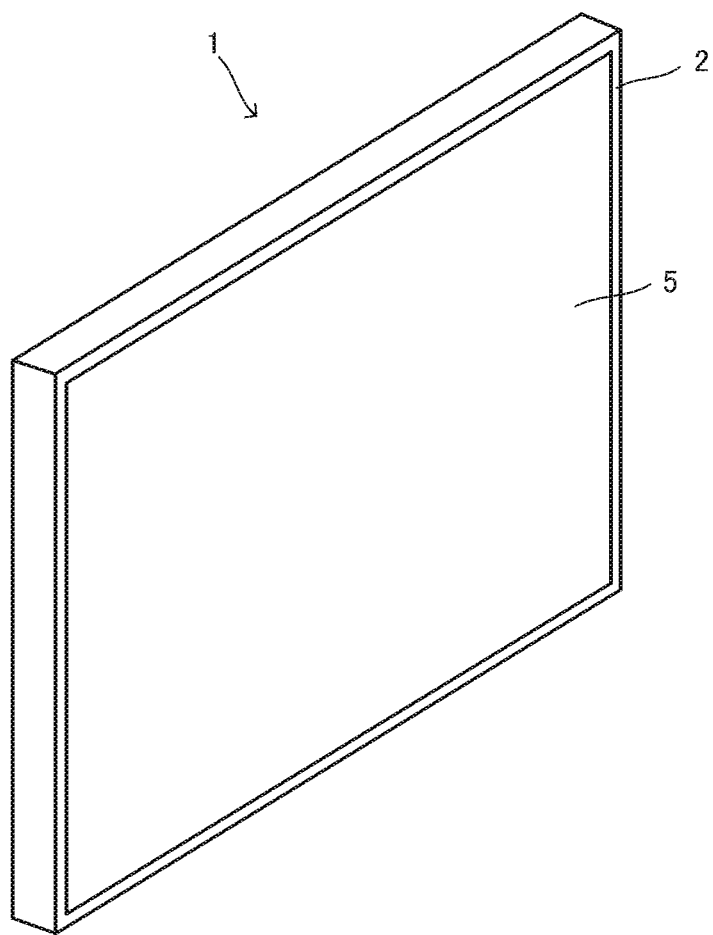
FIG. 1 is an external perspective view of an image display device 1.

Hereinafter each embodiment will be described based on the drawings. The present invention is not limited to these embodiments. Because most of elements included in each embodiment are actually very minute or very thin layers, parts of the elements are varied, enlarged, etc. to be shown in the drawings for understandability. While signs are appended to the elements, parts of signs which are repeated are sometimes omitted for visibility.

FIG. 1 is a view to explain one embodiment, and is a perspective view showing an image display device 1 including an image source unit 5. The right on the page of FIG. 1 is an observer side. Here, the image display device 1 of this embodiment is an image display device for the use in cars, and examples thereof include a car navigation device. The image display device 1 includes a housing 2. The image source unit 5 is built in inside the housing 2.

The housing 2 forms an outer shell of the image display device 1. The housing 2 is a member that houses thereinside almost all the members constituting the image display device. The housing 2 has an opening. A so-called screen portion of the image source unit 5 is exposed through the opening, which makes it possible to be visually recognized. The image display device 1 includes other various known components for functioning as an image display device.

Figure 2:
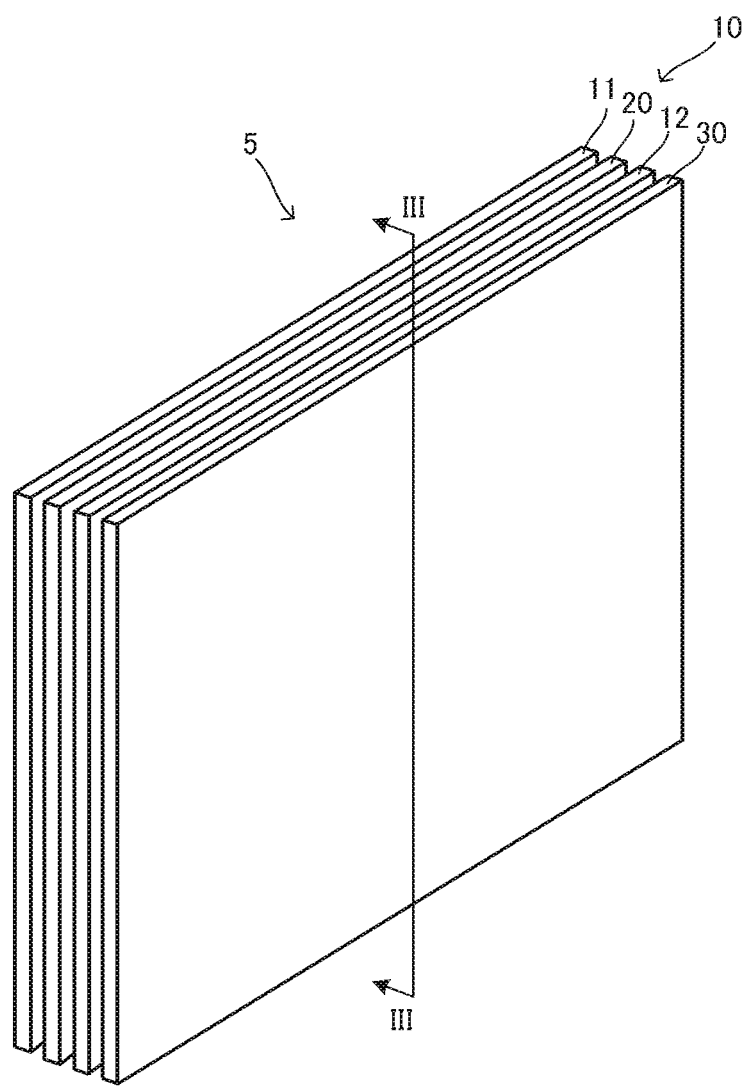
FIG. 2 is an exploded perspective view of an image source unit 5.
Figure 3:
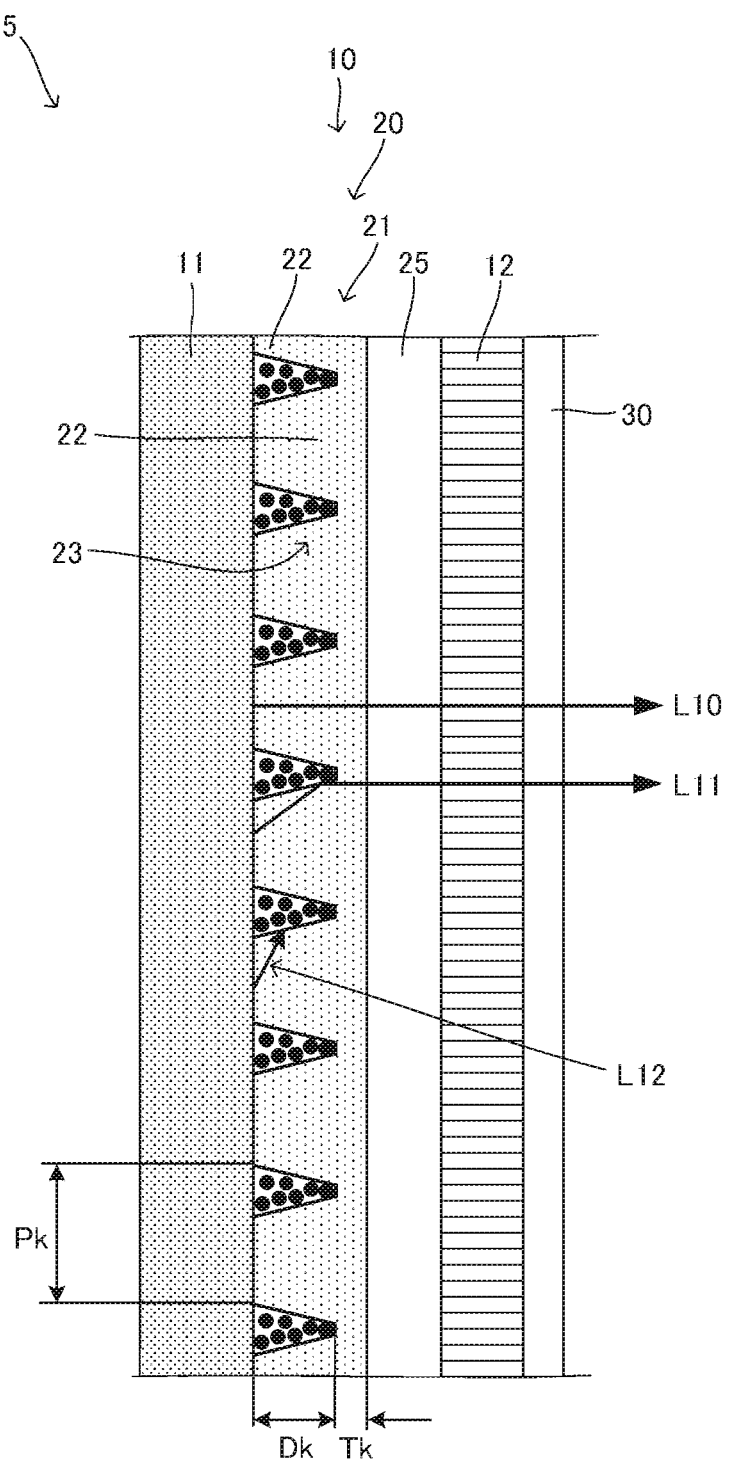
FIG. 3 is a cross-sectional view to explain the layer structure of the image source unit 5.

FIG. 2 is an exploded perspective view of the image source unit 5. FIG. 2 separately shows part of the layers that constitute the image source unit for understandability. Actually, the layers directly overlie each other or the like, to be layered (see FIG. 3). FIG. 3 is a cross-sectional view in a thickness direction, including the line shown by III-III in FIG. 2 (the line in a vertical direction). When the image source unit 5 is disposed in the image display device 1, the right of the sheet of each of FIGS. 2 and 3 is an observer side, and the left thereof is a light source side.

The image source unit 5 is composed of an image source 10 and a function layer 30 that is arranged in an image emission side of the image source 10 (that is, in the observer side).

This embodiment is structured to include a liquid crystal panel 12 in the image source 10. Specifically, the image source 10 includes a surface light source device 11, an optical sheet 20 and the liquid crystal panel 12. That is, in this embodiment, the optical sheet 20 is arranged between the surface light source device 11 and the liquid crystal panel 12.

Here, the surface light source device 11 and the liquid crystal panel 12 of known structures can be used.

Examples of the surface light source device 11 include a surface light source device composed of a reflection sheet, a light guide plate (a light emission source is arranged in its side surface), a diffusion sheet, a lens (prism) sheet and a reflective polarizing sheet, which are layered in this order from the light source side (the left on the page of FIG. 3) to the observer side (the right thereof). That is, in this embodiment, the optical sheet 20 is layered on the reflective polarizing sheet.

Examples of the liquid crystal panel 12 include a liquid crystal panel composed of a polarizing film, a glass substrate, a liquid crystal layer, a glass substrate and a polarizing film, which are layered in this order from the light source side (the left on the page of FIG. 3) to the observer side (the right thereof).

In this embodiment, the optical sheet 20 consists of a plurality of layers, and is arranged between the surface light source device 11 and the liquid crystal panel 12 in a light emission side of the surface light source device 11. In this embodiment, the optical sheet 20 includes an optical function layer 21 and a substrate layer 25, which are arranged in this order from the side of the surface light source device 11. Each of the layers will be described below. For convenience, the substrate layer 25 will be described first, and after that, the optical function layer 21 will be described.

The substrate layer 25 is a layer that is a substrate for forming the optical function layer 21 on one surface thereof. The substrate layer 25, having translucency, supports the optical function layer 21 so as to prevent the optical function layer 21 from deforming. In view of this, concrete examples of materials that constitute the substrate layer 25 include transparent resin mainly constituted by an acrylic resin, styrene, polycarbonate, polyethylene terephthalate (PET), acrylonitrile and/or triacetyl cellulose (TAC), and epoxy acrylate and urethane acrylate based reactive resin (such as ionizing radiation curable type resin).

Among them, it is preferable to use TAC, a methacrylate resin and/or polycarbonate, which is/are with low birefringence, in view of the combination with the liquid crystal panel. Further, it is desirable to use polycarbonate, which has a high glass transition temperature, for the use in cars and so on where a high heat resisting property is required. Specifically, the glass transition temperature of polycarbonate is 143° C. Polycarbonate is suitable for the use in cars, where durability at 105° C. is generally required.

Non-limiting thickness of the substrate layer 25 is preferably 25 μm to 300 μm. There is a risk that some problem occurs in processability in a case where thickness of the substrate layer 25 is out of the above range. For example, creases tend to be generated on the substrate layer 25 thinner than 25 μm. If the substrate layer 25 is thicker than 300 μm, it gets difficult to roll up the optical sheet 20.

A surface of the substrate layer 25 which is not in touch with the optical function layer 21 may be a rough surface. In a case where a rough surface is formed, its surface roughness is preferably 0.1 μm to 0.2 μm in Ra (μm) (JIS B 0601 (2001) arithmetical mean roughness). The surface roughness within the above range makes it possible to be suppressed: generation of interference fringes due to so-called optical contact when the optical sheet 20 touches other layers; and generation of something bad in the exterior view such as scintillation (so-called glare on the screen), which originates from people's easy recognition of unevenness based on the roughness.

Figure 4:
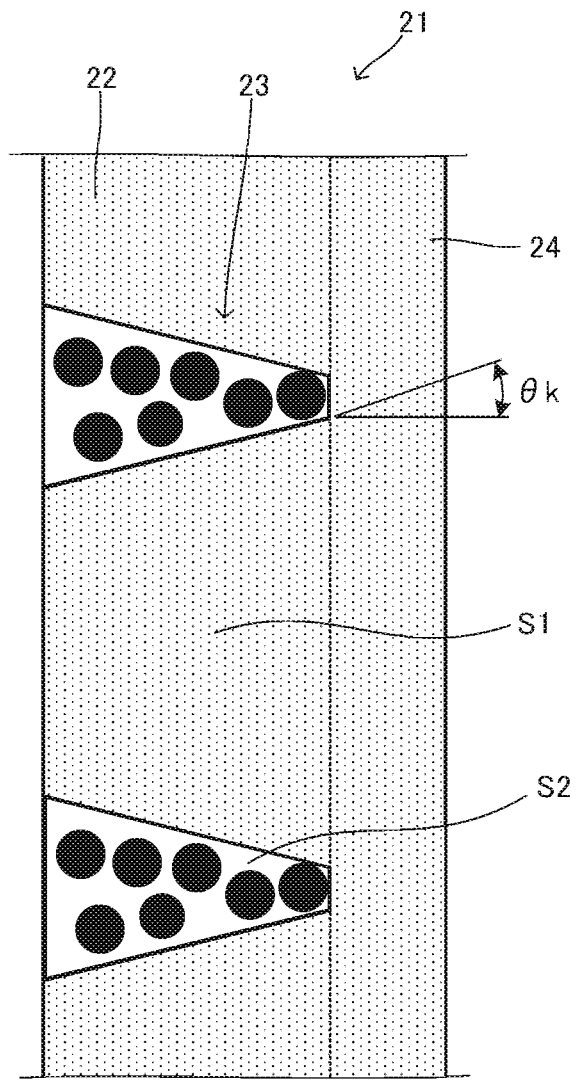
FIG. 4 is an enlarged view focusing on an optical function layer 21.

In this embodiment, the optical function layer 21 has a function of changing a direction of an image light to the front direction, and absorbing part of an image light that is emitted by the image source 10, so that the image light is not reflected in a windshield of a car. That is, the optical function layer 21 is a layer having a light blocking effect of controlling a direction where light travels. FIG. 4 shows a partially enlarged view of FIG. 3, focusing on the optical function layer 21.

In this embodiment, the optical function layer 21 has a cross section shown in FIGS. 3 and 4, and has a shape extending in a direction into and out of the page. In this embodiment, this extending direction is a horizontal direction in a state where the image display device 1 is installed in a car. This prevents an image light from being reflected in a windshield as described below.

The optical function layer 21 includes light transmission parts 22, which are trapezoids on the cross section appearing in FIGS. 3 and 4, and light absorption parts 23 having cross sections of trapezoids, each of which is formed between two adjacent light transmission parts 22. Thus, in this embodiment, the light transmission parts 22 and the light absorption parts 23 are arranged in a row alternately in a vertical direction in a state where the image display device 1 is installed in a car.

A light transmission part 22 is a part whose main function is to transmit light. In this embodiment, the light transmission part 22 is an isosceles trapezoid having a longer lower base in the substrate layer 25 side (observer side) and a shorter upper base in the opposite side (surface light source device 11 side), on the cross section appearing in FIGS. 3 and 4. The light transmission part 22 extends along a surface of the substrate layer 25 while keeping the cross section, and some light transmission parts 22 are arranged in a row at intervals in a direction different from this extending direction. A space of a trapezoidal cross section is formed between adjacent light transmission parts 22. Thus, this space has the trapezoidal cross section of a longer lower base in the upper base side of the light transmission part 22 and a shorter upper base in the lower base side of the light transmission part 22. The space is filled with necessary materials described later, which forms a light absorption part 23. This embodiment has a linking part 24 that links the adjacent light transmission parts 22 together in their longer lower base sides.

A refractive index of the light transmission part 22 is represented by Nt. Such a light transmission part 22 can be formed by curing transmission part constituting components. A non-limiting value of the refractive index Nt is preferably no less than 1.55 in view of proper total reflection of light on the interface between inclines of the trapezoidal cross sections of the light transmission part 22 and the light absorption part 23 as described below. More preferably the refractive index is no less than 1.56. It is noted that the refractive index Nt is preferably no more than 1.61 because most of materials of excessively high refractive indexes easy to crack.

Here, examples of components constituting the light transmission part include epoxy acrylate, urethane acrylate, polyether acrylate, polyester acrylate and polythiol based ionizing radiation (like ultraviolet) curable type resin.

The light absorption part 23 is arranged in the above described space that is formed between the adjacent light transmission parts 22, and its shape of a cross section is the same as that of the space. Therefore, the cross section of the light absorption part 23 is an isosceles trapezoid whose shorter upper base faces the substrate layer 25 side (observer side) and whose longer lower base faces the opposite side (surface light source device 11 side). A refractive index of the light absorption part 23 is represented by Nr. The light absorption part 23 is configured so as to be able to absorb light. Specifically, light absorbing particles disperse into binder having the refractive index of Nr. The refractive index Nr is lower than the refractive index Nt of the light transmission part 22. A non-limiting value of the refractive index Nr is preferably no more than 1.50, and more preferably no more than 1.49. The reference index Nr is preferably no less than 1.47 in view of availability.

Non-limiting difference between the refractive index Nt of the light transmission part 22 and the refractive index Nr of the light absorption part 23 is preferably no less than 0.05. As well, a non-limiting upper limit of the difference in refractive index is preferably no more than 0.14 in view of availability of materials.

Non-limiting examples of materials used as the binder here include photocurable resin such as urethane (meth) acrylate, polyester (meth)acrylate, epoxy (meth)acrylate and butadiene (meth)acrylate.

While light absorbing colored particles such as carbon black are preferably used as the light absorbing particles, the light absorbing particles are not limited thereto. Colored particles that selectively absorb a specific wavelength may be used for the light absorbing particles depending on characteristics of an image light. Specific examples of colored particles include carbon black, graphite, metallic salts such as black iron oxide, organic fine particles colored with dyes, pigments and the like, and colored glass beads. Especially, colored organic fine particles are preferably used in view of the cost, quality, availability and so on. An average particle size of colored particles is preferably 0.01 µm to 20 µm.

In this embodiment, 78.2% to 88.5% is a percentage of the cross-sectional area of the light transmission part 22 in the total cross-sectional area of one adjacent light transmission part 22 and light absorption part 23 (this is the cross-sectional area that is on the cross section appearing in FIG. 4, and that is in the direction orthogonal to the direction where the light transmission part 22 and the light absorption part 23 extend) (this percentage is referred to as "a proportion of the cross-sectional area of the light transmission part"). Here, the light transmission part 22 is that existing between adjacent light absorption parts 23, and in this embodiment, the cross-sectional area of the light transmission part 22 is that of an isosceles trapezoid, as shown by S1 in FIG. 4. The cross-sectional area of the light absorption part 23 is that of an isosceles trapezoid in this embodiment as shown by S2 in FIG. 4.

This makes it possible to realize a high level of the efficiency of light utilization while a predetermined light blocking effect is kept. If the proportion of the cross-sectional area of the light transmission part is smaller than 78.2%, the efficiency of utilization of light supplied from the light source gets low. In contrast, if the proportion of the cross-sectional area of the light transmission part is beyond 88.5%, the light blocking effect deteriorates, which results in transmission of light that is to be removed. In addition, if the proportion of the cross-sectional area of the light transmission part is beyond 88.5%, the light absorption part gets minuter, which makes it difficult to make the light absorption part of a high accuracy.

There is nothing special to be limited in addition to the above. The light transmission part 22 and the light absorption part 23 may be formed as follows as an example. That is, a pitch of the light transmission part 22 and the light absorption part 23, which is shown by Pk in FIG. 3, is preferably 30 µm to 100 µm. It is also preferable that: the interface between inclines of the light absorption part 23 and the light transmission part 22, and a normal line to the surface of the optical function layer 21 be at an angle within the range of 0° to 10°, which is shown by θk in FIG. 4. It is also preferable that thickness of the light absorption part 23, which is shown by Dk in FIG. 3, be 60 µm to 150 µm. The pitch, angle and thickness within the above ranges allows balance between light transmission and light absorption to be much better.

This embodiment illustrates that the interface between the light transmission part 22 and the light absorption part 23 (leg part) is in a straight line on the cross section. The interface is not limited thereto, and may be in a zigzag line, a curved convex surface, a curved concave surface, or the like. A plurality of the light transmission parts 22 and the light absorption parts 23 may have the same shape of the cross sections, and may have different shapes thereof with predetermined regularities.

In this embodiment, the optical diffuse reflectance measured on the light output side of the optical sheet 20 can be within a predetermined range that will be shown later. This makes it possible to prevent interference fringes and scintillation, and at the same time to highly secure a demanded light blocking effect of the optical sheet 20. If this optical diffuse reflectance is lower than the predetermined range, interference fringes and scintillation (glare) are easy to be generated. In contrast, if this optical diffuse reflectance is higher than the predetermined range, there is a risk that some problem arises in the light blocking effect. The details of a method for measuring the optical diffuse reflectance will be described later.

A means for making the optical diffuse reflectance measured on the light output side of the optical sheet 20 within the predetermined range is not especially limited. Examples of this means include known light diffusing means such as: making a surface of the substrate layer 25 rough; and dispersing light-scattering particles into the substrate layer 25.

Such an optical diffuse reflectance is not decided only depending on a mode of the light diffusing means, but is also influenced by modes of the light transmission part and the light absorption part. Thus, the optical diffuse reflectance is related to a whole mode of the optical sheet.

Further, the optical diffuse reflectance measured on the light input side of the optical sheet 20 is preferably within a predetermined range that will be shown later. This makes it possible to suppress scintillation (so-called glare).

The details of a method for obtaining the optical diffuse reflectance on the light input side will be described later.

Figure 5:
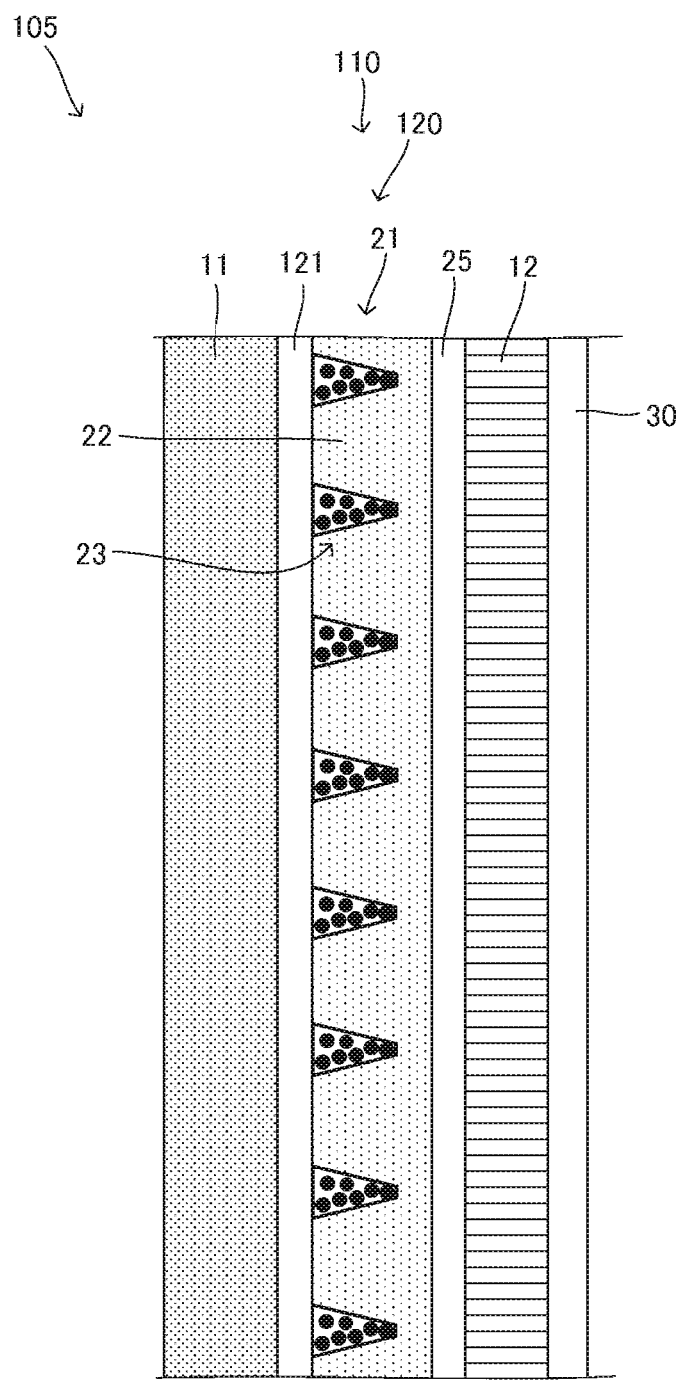
FIG. 5 is a cross-sectional view to explain a layer structure of an image source unit 105.

Nothing particular is limited in order to obtain such an optical diffuse reflectance on the light input side, and the light input surface of the optical function layer 21 may be adjusted. In addition, for example, a structure as shown in FIG. 5 can be taken. FIG. 5 corresponds to FIG. 3, and is a cross-sectional view showing a layer structure of an image source unit 105. The image source unit 105 includes an optical sheet 120. This optical sheet 120 is structured so that a transparent resin layer 121 is layered on a surface of the above described optical function layer 21 of the optical sheet 20 in the side opposite to the substrate layer 25. The optical diffuse reflectance on its light input side can be a desired value by employing light diffusing means such as: making a surface of the transparent resin layer 121 rough; containing light-scattering particles in the transparent resin layer 121; and employing both means.

In this case as well, the optical diffuse reflectance is not decided only depending on a mode of the light diffusing means, but is also influenced by modes of the light transmission part and the light absorption part. Thus, the optical diffuse reflectance is related to a whole mode of the optical sheet.

When the optical sheet 20 and the reflective polarizing plate that is arranged on the light input side of the optical sheet 20 are combined to form a laminate, the optical diffuse reflectance measured on the light output side of the optical sheet 20 can be within a predetermined range that will be shown later. This also makes it possible to prevent interference fringes and scintillation, and at the same time to highly secure a demanded light blocking effect of the optical sheet 20.

Further, in the laminate of the combination of the optical sheet 20 and the reflective polarizing plate, the optical diffuse reflectance measured on the light input side of the optical sheet 20 can be within a predetermined range that will be shown later. This also makes it possible to suppress scintillation (so-called glare).

The details of measurement of the optical diffuse reflectances in these cases will be described later as well.

Figure 6A:
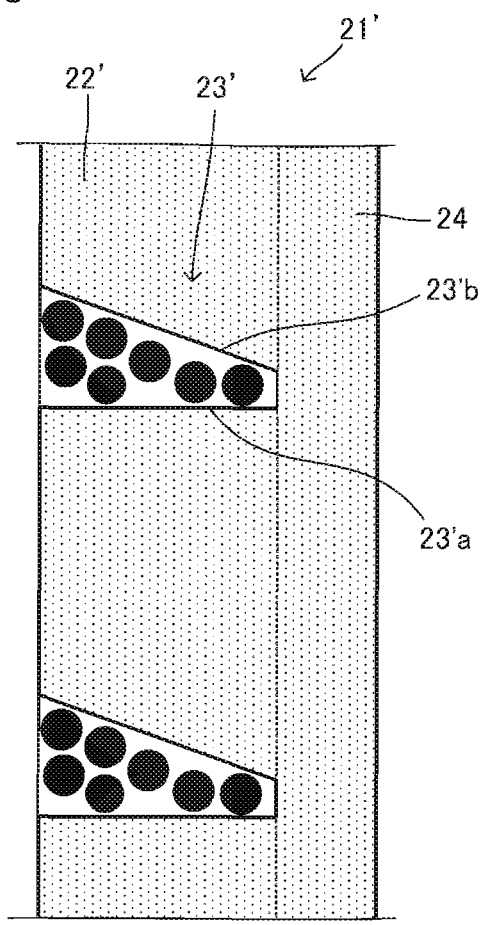
FIG. 6A is a view to explain an optical function layer 21'.
Figure 6B:
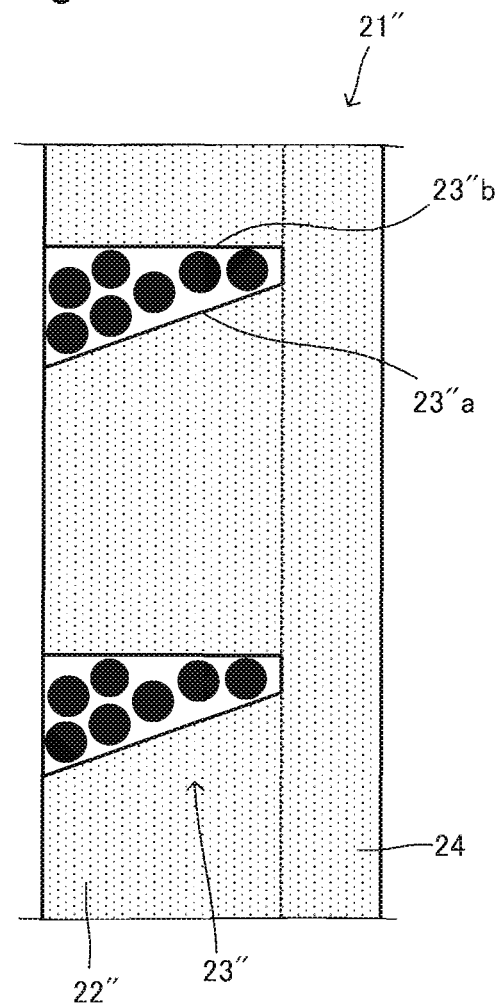
FIG. 6B is a view to explain an optical function layer 21"

FIGS. 6A and 6B each show an example of asymmetric leg parts in a trapezoidal cross section. FIGS. 6A and 6B correspond to FIG. 4. FIG. 6A shows an example of an optical function layer 21' and FIG. 6B shows an example of an optical function layer 21".

The optical function layer 21' shown in FIG. 6A has light transmission parts 22' and light absorption parts 23'. Materials constituting this, and ways of grasping its refractive index, proportion of the area of the light transmission part, and the optical diffuse reflectance are the same as those of the optical function layer 21.

As is seen from FIG. 6A, the leg parts of the light absorption part 23' in the trapezoidal cross section have a further feature in this example. Two leg parts of the light absorption part 23' form different angles with a normal line to a layer surface of the optical function layer 21'. In more detail, the angle formed by a leg part 23'a, which is a lower leg part in a state where the image display device is installed, is smaller than that formed by a leg part 23'b, which is an upper leg part in this state. More preferably, the angle formed by the leg part 23'a is 0° (that is, the leg part 23'a is parallel to the normal line to the layer surface of the optical function layer 23'). This makes it possible to efficiently suppress light (image light) travelling upward, and to further suppress reflection in a windshield in a case of installation in a car.

In contrast, the optical function layer 21" shown in FIG. 6B has light transmission parts 22" and light absorption parts 23". Ways of grasping its proportion of the area of the light transmission part, and the optical diffuse reflectance are the same as those of the optical function layer 21. The optical function layer 21" has a mode that inclines of the leg parts have an inverse relationship to those of the optical function layer 21'. Whereby emission of image light diagonally upward increases. In a case where it is no problem to reflect light in a windshield, a clear image can be observed in a view diagonally upward.

Such an optical sheet 20 is made as follows for example.

First, the light transmission part 22 is formed on one surface of the substrate layer 25. For this, a substrate sheet that is to be the substrate layer 25 is inserted between a mold roll having such a shape on its surface that the shape of the light transmission part 22 can be copied thereon and a nip roll arranged so as to face the mold roll. Then, the mold roll and the nip roll are rotated while composition for constituting the light transmission part is supplied between the substrate sheet and the mold roll. Whereby, the composition for constituting the light transmission part is filled into grooves (have a shape of an inverted light transmission part) formed on the surface of the mold roll, which correspond to the light transmission part, and thus the shape of the composition corresponds to that of the surface of the mold roll.

The composition for constituting the light transmission part, which is sandwiched and filled between the mold roll and the substrate sheet, is irradiated with light for curing in the substrate sheet side by a light irradiation device, which makes it possible to cure the composition and fix its shape. Then, the substrate layer 25 and the molded light transmission part 22 are separated from the mold roll by means of a release roll.

Next, the light absorption part 23 is formed. In order to form the light absorption part 23, first, composition for constituting the light absorption part is filled into intervals between the above molded light transmission parts 22. Thereafter, an excessive amount of the composition is scraped off by a doctor blade or the like. Then, the remaining composition is irradiated with ultraviolet rays in the light transmission part 22 side to be cured, to form the light absorption part 23.

Examples of the function layer 30 include known layers arranged nearer to the observer side than the liquid crystal panel and having various functions, such as anti-reflection layers, anti-glare layers and hardcoat layers.

The image source unit 5 having the structure as described above can be made as follows for example: that is, the made optical sheet 20 is arranged in the light emission side of the surface light source device 11 so that a side thereof opposite to the substrate layer 25 (that is, the optical function layer 21) faces the surface light source device 11. The liquid crystal panel 12 and the function layer 30 are layered on the observer side of the optical sheet 20.

The image source unit 5 structured as above is housed into the housing 2, and the housing 2 is arranged so that the function layer 30 side is in the observer side, which makes it possible to structure the image display device 1. At this time, electric circuits, power supply circuits and the like for operating the image source unit 5 are also provided if necessary.

Such an image display device is installed in a car, and operates as follows for example, which will be described with examples of optical paths. These examples of optical paths are for the description and conceptual, and do not illustrate reflection, refraction or the like strictly.

When the image display device 1 is operated, the surface light source device 11 emits lighting as shown in FIG. 3. Light L10 emitted by the surface light source device 11 transmits the optical sheet 20 without reaching any interface between the light transmission part 22 and the light absorption part 23, transmits the liquid crystal panel 12 as obtaining image information in the liquid crystal panel 12, and also transmits the function layer 30, to reach the observer side. An observer can observe the image light.

Light L11 emitted by the surface light source device 11 reaches an interface between the light transmission part 22 and the light absorption part 23. Total reflection occurs in the light L11 in relation to difference between both in refractive index and its incidence angle at the interface. The light L11 transmits the liquid crystal panel 12 as obtaining image information in the liquid crystal panel 12, and also transmits the function layer 30, to be emitted in the observer side. At this time, since the interface between the light transmission part 22 and the light absorption part 23 inclines to the normal line to the light output surface of the optical sheet 20 as described above, the direction of the light L11 is changed downward, and the light is blocked from travelling upward (light blocking is carried out), which prevents the light L11 from being reflected in a windshield. Since the light L11 directs in the front direction, such light L11 also contributes to improvement of front brightness of image light.

Light L12 emitted by the surface light source device 11 reaches an interface between the light transmission part 22 and the light absorption part 23, transmits the interface in relation to difference between both in refractive index and its incidence angle at the interface, and is absorbed by the light absorption part 23. This blocks the light from travelling upward (light blocking is carried out), and prevents the light from being reflected in a windshield.

Since the proportion of the cross-sectional area of the light transmission part is constituted as described above in this embodiment, a stray light like the light L12 is absorbed, and at the same time light emitted in the observer side like the light L10 and the light L11 can be efficiently obtained, which makes it possible to keep the efficiency of utilization of light high.

The optical diffuse reflectance in at least the light output side of the optical sheet is constituted as described above in this embodiment, occurrence of interference fringes can be suppressed, and light can be blocked from travelling in an unintended direction due to diffusion of the light (in this embodiment, reflection in a windshield due to light travelling upward), which makes it possible to carry out light blocking. Therefore, a high light blocking effect can be kept, and high front brightness can be achieved.

<Test A>

As Test A, optical sheets according to nine examples where the shapes of the cross sections of the light transmission parts and the light absorption parts varied (Nos. 1 to 9) were made, to check the efficiency of light utilization.

(No. 1)

Figure 7:
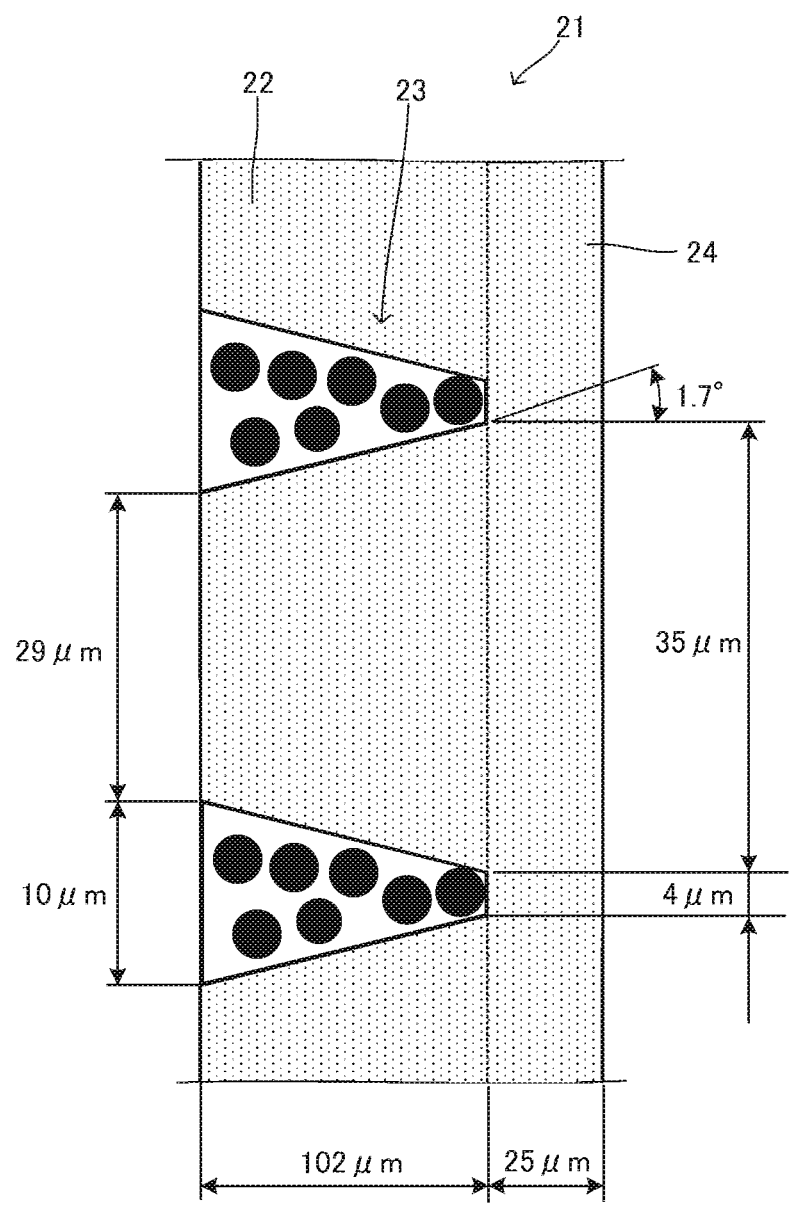
FIG. 7 is a view to explain an embodiment of an optical function layer No. 1.

In No. 1, an optical sheet that included an optical function layer having a shape of the cross section shown in FIG. 7 was made. This optical sheet was formed of the optical function layer and a substrate layer, and was made by the above described method.

More specifically, polycarbonate resin of 130 μm in thickness was used for the substrate layer.

UV-curable urethane acrylate of 1.56 in refractive index was used for the light transmission part. The cross section of the light transmission part was an isosceles trapezoid of 29 μm in upper base, 35 μm in lower base and 102 μm in height.

UV-curable urethane acrylate of 1.49 in refractive index was used for the binder of the light absorption part. Acrylic beads containing carbon black was included in the binder so that the content thereof was 25 mass % on the basis of the whole of the composition constituting the light absorption part. The cross section of the light absorption part was an isosceles trapezoid of 4 μm in upper base, 10 μm in lower base and 102 μm in height.

The linking part was 25 μm in thickness (Tk in FIG. 3).

A 6.5-inch liquid crystal display (LQ65T5GG03, manufactured by Sharp Corporation) was equipped with each of the optical sheets as the above, to be a liquid crystal display. More specifically, the optical sheet was arranged in the light output surface side of a surface light source device that consisted of a light guide plate in a side surface of which a light emission source was arranged, a prism sheet, a light diffusion film and a reflective polarizing plate; and a liquid crystal panel was arranged in the light output surface side of the optical sheet.

(No. 2)

Figure 8:
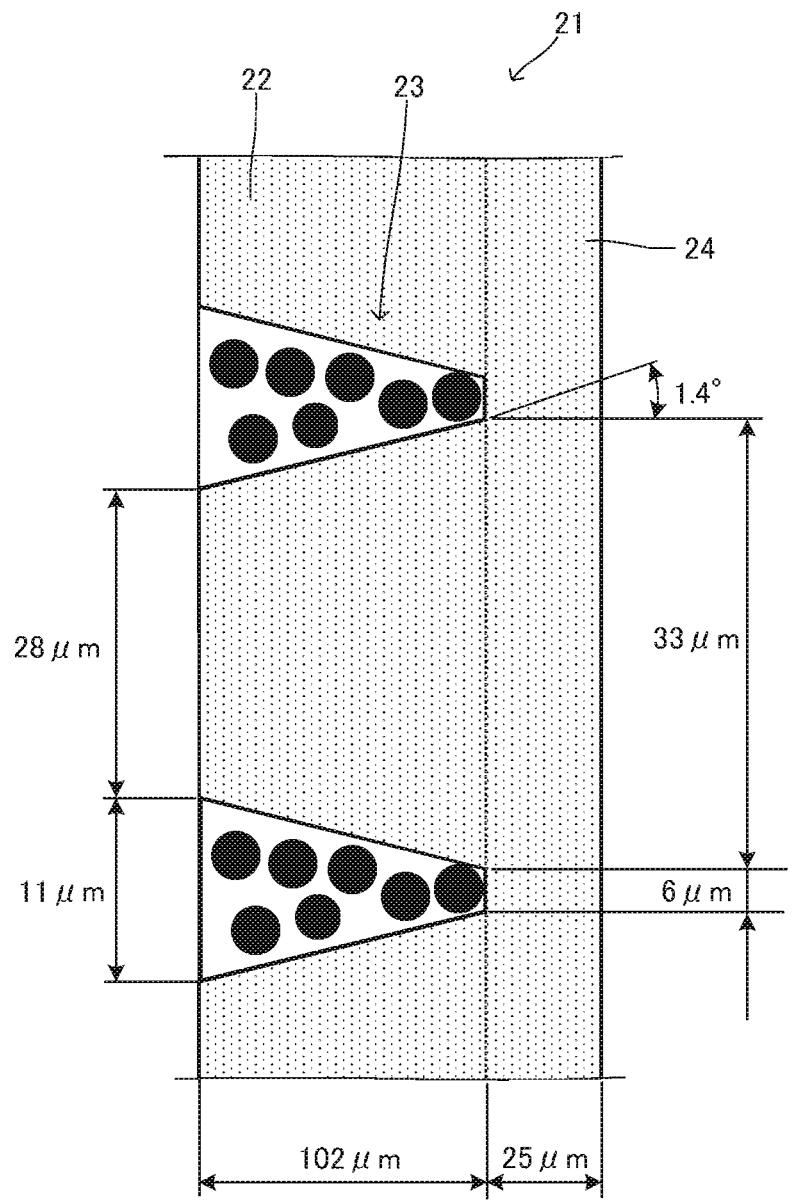
FIG. 8 is a view to explain an embodiment of an optical function layer No. 2.

No. 2 was the same as No. 1 except that the shapes of the cross sections of the light transmission parts and the light absorption parts were changed as FIG. 8.

(No. 3)

Figure 9:
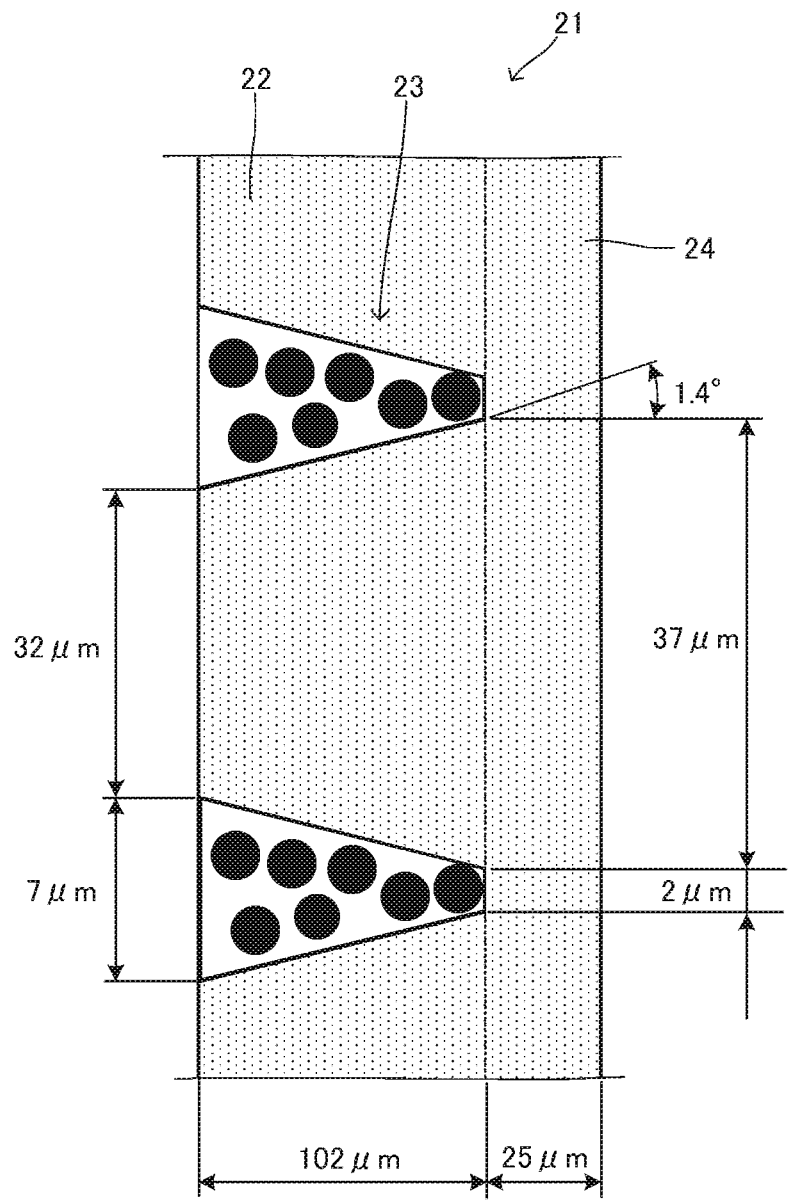
FIG. 9 is a view to explain an embodiment of an optical function layer No. 3.

No. 3 was the same as No. 1 except that the shapes of the cross sections of the light transmission parts and the light absorption parts were changed as FIG. 9.

(No. 4)

Figure 10:
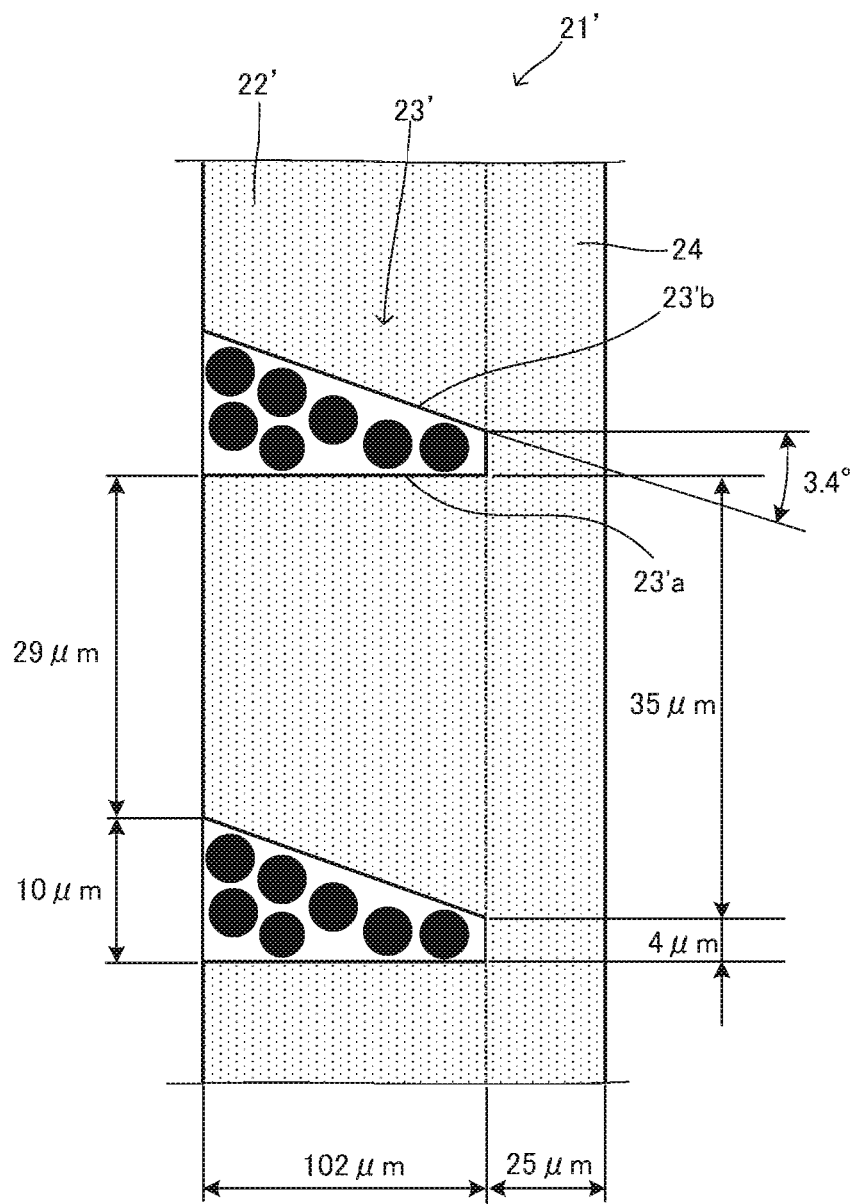
FIG. 10 is a view to explain an embodiment of an optical function layer No. 4.

The example shown in FIG. 5 was followed by No. 4. No. 4 was an example that angles of inclination of two leg parts of the light transmission part and the light absorption part were different. Specifically, the shapes of the cross sections of the light transmission parts and the light absorption parts were changed as FIG. 10. Here, an angle of inclination of the leg part 23'a was 0° (that is, the leg part 23'a was parallel to the normal line to the layer surface of the optical sheet). Other details were the same as No. 1.

(No. 5)

Figure 11:
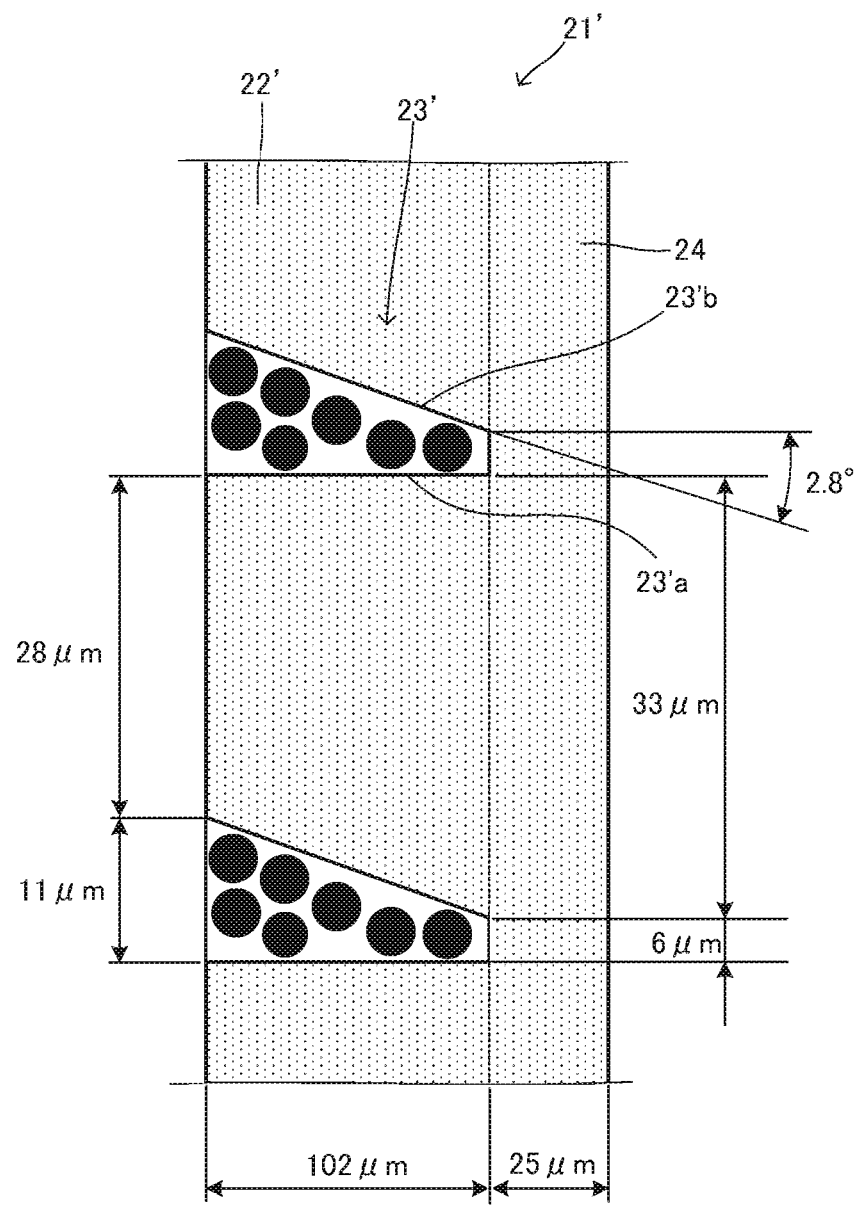
FIG. 11 is a view to explain an embodiment of an optical function layer No. 5.

No. 5 was the same as No. 4 except that the shapes of the cross sections of the light transmission parts and the light absorption parts were changed as FIG. 11.

(No. 6)

Figure 12:
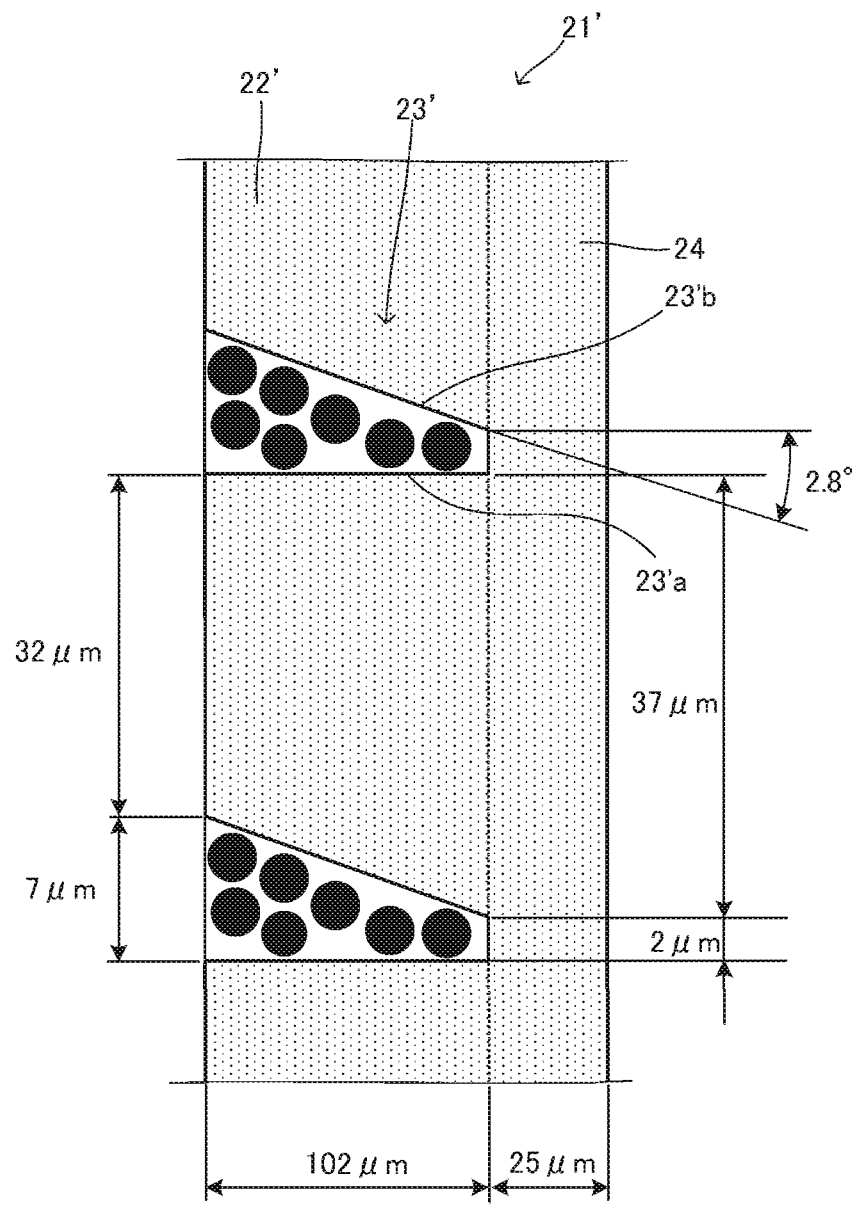
FIG. 12 is a view to explain an embodiment of an optical function layer No. 6.

No. 6 was the same as No. 4 except that the shapes of the cross sections of the light transmission parts and the light absorption parts were changed as FIG. 12.

(No. 7)

Figure 13:
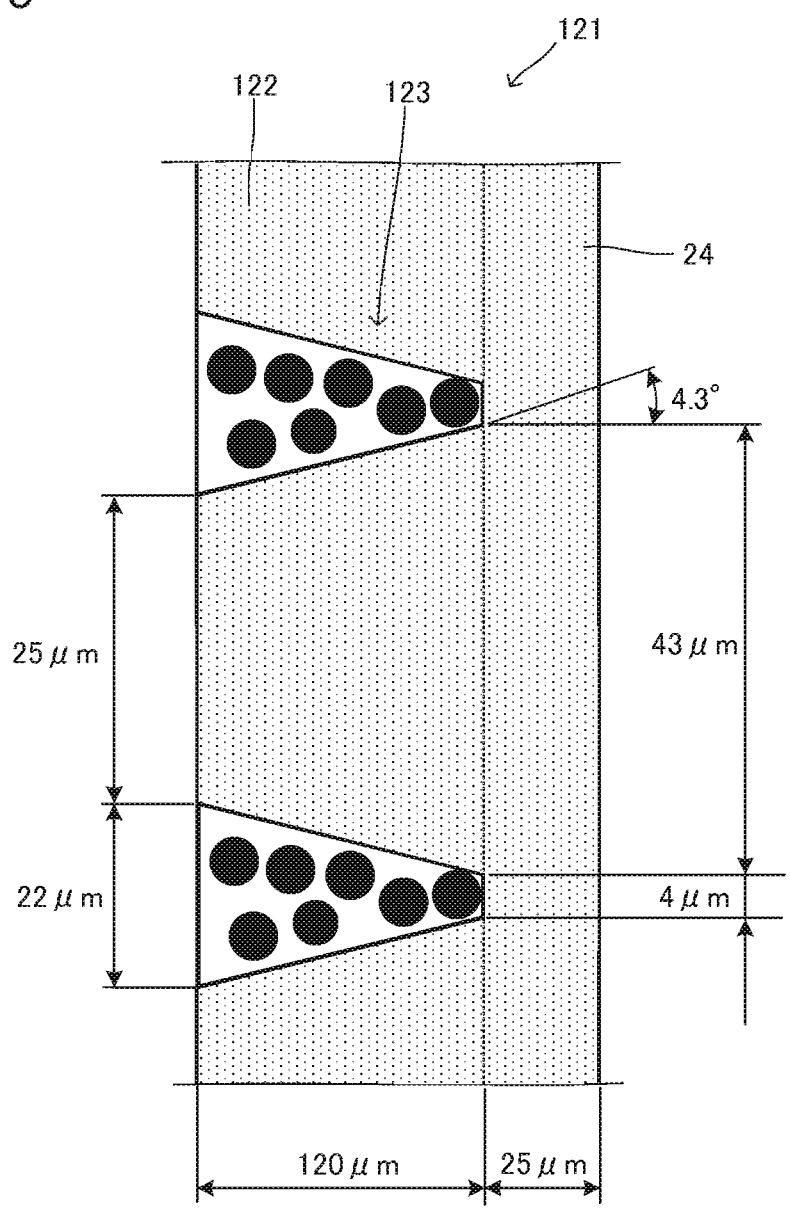
FIG. 13 is a view to explain an embodiment of an optical function layer No. 7.

No. 7 was the same as No. 1 except that the shapes of the cross sections of the light transmission parts and the light absorption parts were changed as FIG. 13. Here, some signs used in FIGS. 13 to 15 represent an optical function layer 121, a light transmission part 122 and a light absorption part 123.

(No. 8)

Figure 14:
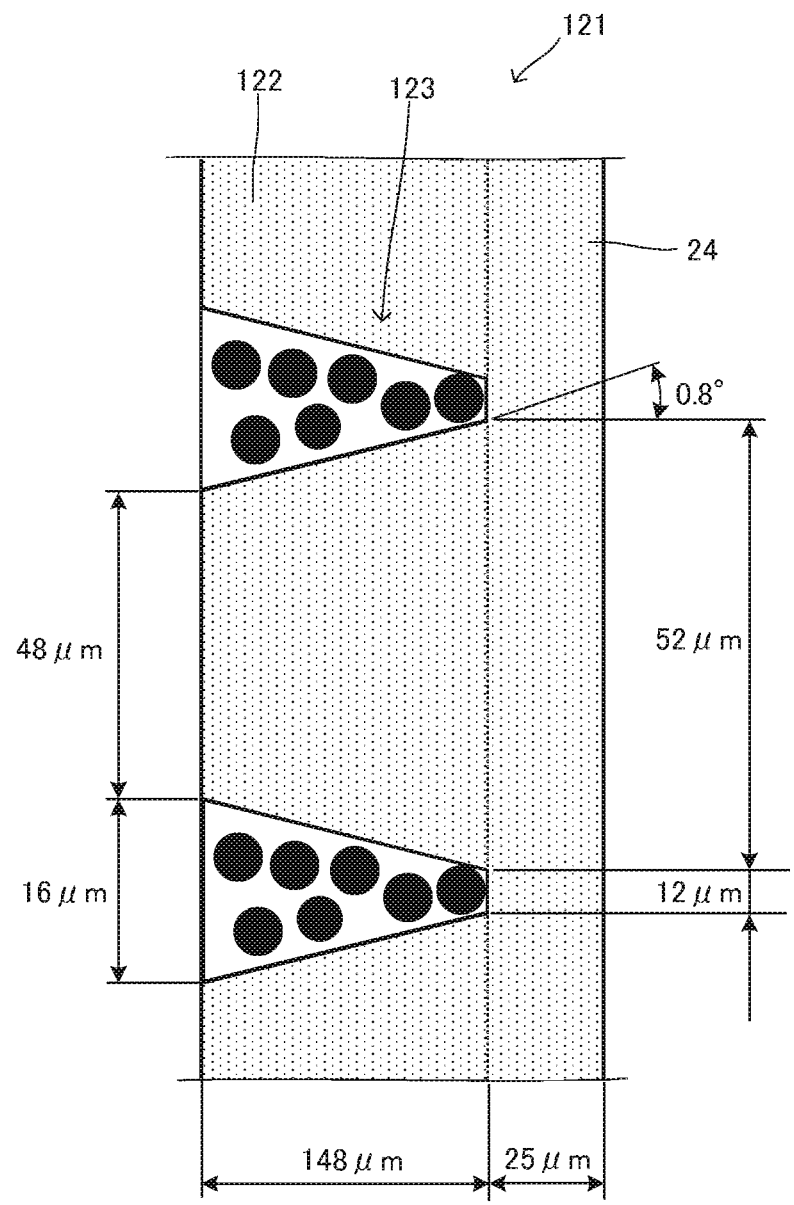
FIG. 14 is a view to explain an embodiment of an optical function layer No. 8.
Figure 15:
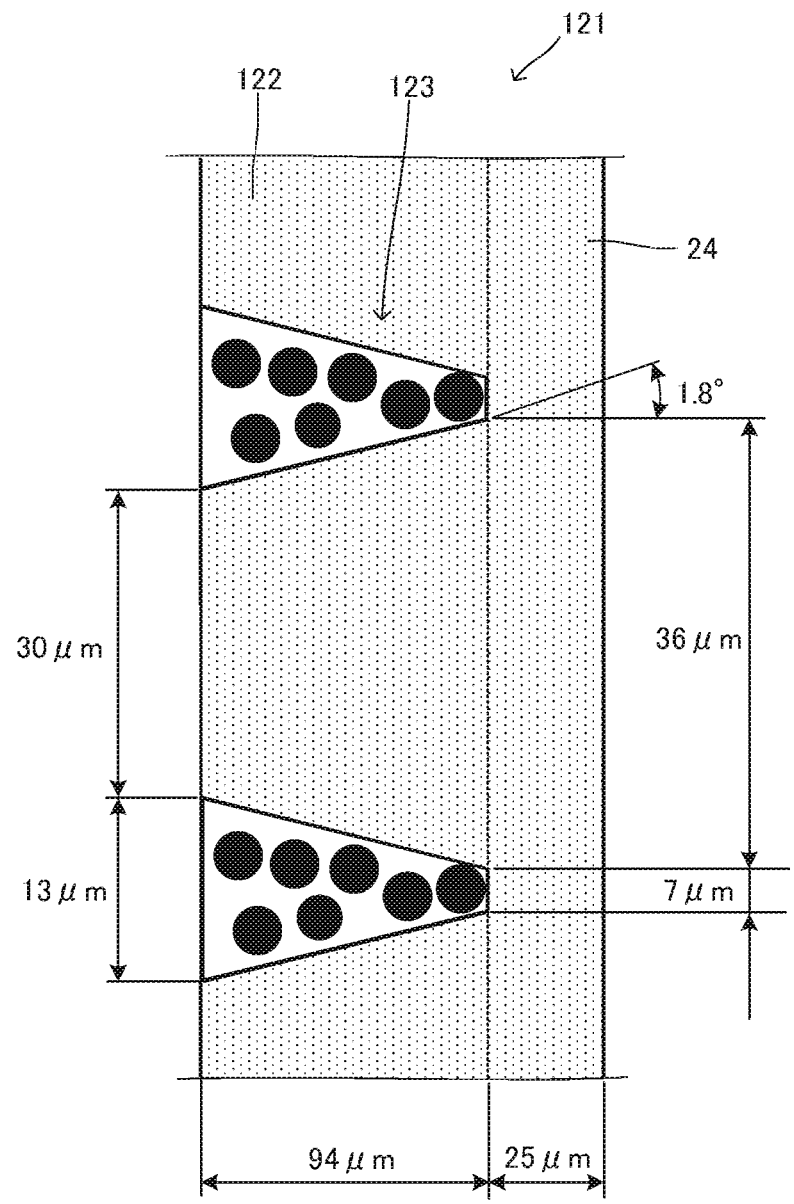
FIG. 15 is a view to explain an embodiment of an optical function layer No. 9.

No. 8 was the same as No. 7 except that the shapes of the cross sections of the light transmission parts and the light absorption parts were changed as FIG. 14.

(No. 9)

No. 9 was the same as No. 7 except that the shapes of the cross sections of the light transmission parts and the light absorption parts were changed as FIG. 15.

Assuming that the normal line direction of the optical sheet was 0°, brightness of each of the above made liquid crystal displays according to Nos. 1 to 9 was measured with EZContrast (manufactured by ELDIM) at the normal line direction and every 10° of inclination from the normal line direction to ±80° in a direction of aligning the light transmission parts and the light absorption parts alternately. Then, their integrated values of brightness were obtained. Thus, it could be said that a larger integrated value of brightness indicated more light emission, which was accompanied by high efficiency of light utilization.

In contrast, as to a light blocking effect, assuming that the normal line direction of the optical sheet was 0°, brightness was measured with EZContrast (manufactured by ELDIM) at the normal line direction and every 10° of inclination from the normal line to ±80° in the direction of aligning the light transmission parts and the light absorption parts alternately. Then, brightness at 45° (the mean of 40° and 50° in brightness) was measured and represented in percentage terms assuming that the front brightness was 100%. A case where a value represented in percentage terms was no more than 10% was regarded as a good light blocking effect.

Table 1 shows characteristic shapes of the light transmission parts and the light absorption parts other than the above description and the measurement results.

"Proportion of cross-sectional area of light transmission part (%)" represents a percentage of the cross-sectional area of the light transmission part 22 or 122 in the total cross-sectional area of one adjacent light transmission part 22 or 122 and light absorption part 23 or 123, respectively. That is, this percentage can be calculated by "area of one light transmission part/(area of one light transmission part+area of one light absorption part)" in each cross section shown in FIGS. 7 to 15.

"Proportion of opening (%)" represents a proportion of an area of the light transmission part 22 or 122 per pitch on a surface side of the optical function layer where incident light comes (in these examples, the shorter upper base side of the light transmission part 22 or 122). That is, this proportion can be calculated by "a length of the upper base of one light transmission part/(a length of the upper base of one light transmission part+a length of the lower base of one light absorption part)" in each cross section shown in FIGS. 7 to 15.

"Integrated brightness" and "Light blocking effect" are as described above.

TABLE 1

|       | Proportion of cross-sectional area of light transmission part (%) | Proportion of opening (%) | Integrated brightness (cd/m²) | Light blocking effect |
|-------|---|---|---|---|
| No. 1 | 82.1 | 74.4 | 2841 | 6.7% |
| No. 2 | 78.2 | 71.8 | 2610 | 5.2% |
| No. 3 | 88.5 | 82.1 | 3200 | 9.8% |
| No. 4 | 82.1 | 74.4 | 2841 | 6.7% |
| No. 5 | 78.2 | 71.8 | 2610 | 5.2% |
| No. 6 | 88.5 | 82.1 | 3200 | 9.8% |
| No. 7 | 72.3 | 53.2 | 2450 | 4.7% |
| No. 8 | 78.1 | 75.0 | 2587 | 4.5% |
| No. 9 | 76.7 | 69.8 | 2530 | 7.0% |

As is seen from Table 1, the integrated brightness of Nos. 1 to 6 was larger than that of Nos. 7 to 9, and the efficiency of light utilization in Nos. 1 to 6 was found to be high. Here, as is seen from the comparison between, for example, No. 1 and No. 2, even if the proportions of openings were approximately the same, the integrated brightness largely differed. All examples had no more than 10% of a light blocking effect, which was good.

<Test B>

In Test B, liquid crystal displays were made with laminates having optical sheets according to examples where the optical diffuse reflectances on the light input sides and the optical diffuse reflectances on the light output sides varied (Nos. 11 to 18), to check interference fringes, scintillation (glares) and a light blocking effect.

An optical sheet that included an optical function layer having light transmission parts and light absorption parts whose shapes of the cross sections were as shown in FIG. 4 was made. More particularly, this optical sheet was formed of the optical function layer, a substrate layer, and a layer having micro-roughness.

Further specifically, matte polycarbonate resin of 130 μm in thickness was used for the substrate layer. That is, a micro-roughness surface formed on a metal mold was copied on a surface of the substrate layer which was on the side opposite to the optical function layer, to form micro-roughness (matte surface).

UV-curable urethane acrylate of 1.56 in refractive index was used for the light transmission part. The cross section of the light transmission part was an isosceles trapezoid of 29 μm in upper base, 35 μm in lower base and 102 μm in height (Dk in FIG. 3).

UV-curable urethane acrylate of 1.49 in refractive index was used for the binder of the light absorption part. Acrylic beads containing carbon black was included in the binder so that the content thereof was 25 mass % on the basis of the whole of the composition constituting the light absorption part. The cross section of the light absorption part was an isosceles trapezoid of 4 μm in upper base, 10 μm in lower base and 102 μm in height (Dk in FIG. 3); The linking part was 25 μm in thickness (Tk in FIG. 3).

In addition, a layer having micro-roughness (matte) was formed of the materials same as the light transmission part, on a surface of the optical function layer which was on the side opposite to the substrate layer, with a metal mold having a micro-roughness surface. Whereby, the optical sheet whose thickness was 280 μm, which was total thickness of the substrate layer, the optical function layer and the layer having micro-roughness, was obtained.

The optical diffuse reflectance on the light input side and the optical diffuse reflectance on the light output side were adjusted according to the substrate layers, and change in degree of micro-roughness (surface roughness) provided on the surface of any metal mold for forming the layer having micro-roughness, to obtain the optical sheets of Nos. 11 to 18. Micro-roughness provided on the surface of the metal molds was formed by copper-plating on the surface of the metal molds and blasting process on the copper plating with glass beads. Its roughness was adjusted according to diameters of the beads for the blasting process and pressure for the blasting process.

The optical diffuse reflectance on the light input side and the optical diffuse reflectance on the light output side of the optical sheet of each example as described above were measured as follows.

Figure 16A:
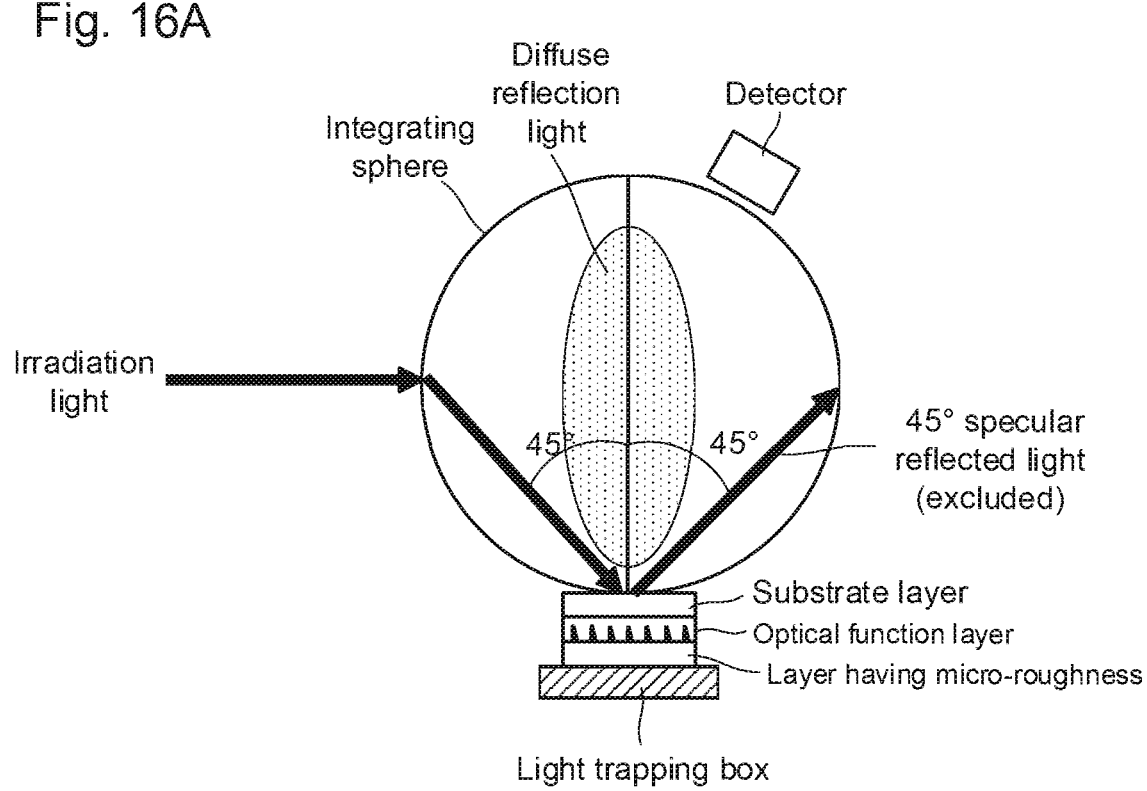
FIG. 16A is a view to explain measurement of an optical diffuse reflectance on the light output side in Test B.
Figure 16B:
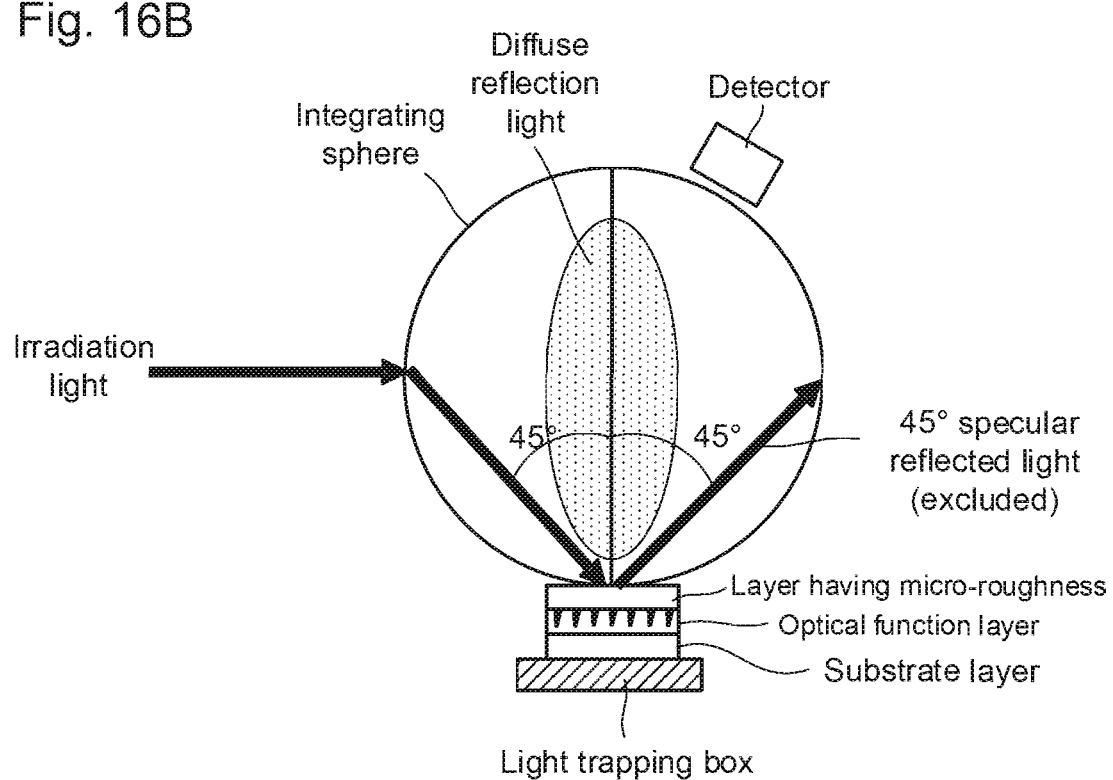
FIG. 16B is a view to explain measurement of an optical diffuse reflectance on the light input side in Test B.

An optical diffuse reflectance is defined by an omnidirectional optical diffuse reflectance that was obtained by excluding a reflectance of specular reflected light from the total reflectance. Specifically, the optical diffuse reflectance was measured using a haze meter (HR-100 by Murakami Color Research Laboratory, measurement condition: reflection) as shown in FIGS. 16A and 16B, which is described in more detail as follows.

A layer to be measured (substrate layer or light diffuser layer) of the optical sheet was directed toward the light input side (integrating sphere side), and a light trapping box that absorbed reaching light was arranged on the opposite side thereof. That is, FIG. 16A shows measurement of the optical diffuse reflectance on the light input side, and FIG. 16B shows measurement of the optical diffuse reflectance on the light output side. A standard white board (barium sulfate, reflectance: 98.3%) was arranged at the position of the light trapping box before measurement, to carry out an initial setting, and thereafter the light trapping box was arranged instead of the standard white board, to conduct measurement.

The optical sheet arranged as described above was irradiated in a direction of alternately aligning the light transmission parts and light absorbing parts with irradiation light (light source D65) inclined at 45° from the normal line of the optical sheet.

In the irradiation light, 45° specular reflected light was excluded from the light reflected by the optical sheet, to obtain omnidirectional light in the integrating sphere at this time by a detector. This was diffuse reflection light. The proportion of the omnidirectional light (diffuse reflection light) to the irradiation light represented in terms of percentage was "optical diffuse reflectance".

While a light trapping box was used for this measurement of optical diffuse reflectance, a method of excluding the transmission light through the optical sheet but not returning this light to the integrating sphere was applied as well.

A liquid crystal display of 6.5-inch (LQ65T5GG03 manufactured by Sharp Corporation) was equipped with each of the optical sheets as the above, to be a liquid crystal display. More specifically, an optical sheet was arranged on the light output surface side of a surface light source device that consisted of a light guide plate on a side surface of which a light emission source was arranged, a prism sheet, a light diffusion film and a reflective polarizing plate; and a liquid crystal panel was arranged on the light output surface side of the optical sheet.

A light blocking effect, occurrence of interference fringes and scintillation (glare) of each of the above made liquid crystal displays according to Nos. 11 to 18 were evaluated visually.

As to "Light blocking effect", assuming that the normal line direction of the optical sheet was 0°, brightness was measured at the normal line direction and every 10° of inclination from the normal line to ±80° with EZContrast (manufactured by ELDIM). Then, a case where a proportion of brightness at 45° (the mean of 40° and 50° in brightness) in the front brightness was no more than 7% was regarded as a good light blocking effect, and is indicated by an open circle. A case where this proportion was no less than 7% is indicated by a cross.

It was checked whether "Interference fringe" and "Scintillation" occurred visually upon turning off the liquid crystal display. A case where no fringe and scintillation occurred is indicated by an open circle, and a case where fringe or scintillation occurred is indicated by a cross.

The results are shown in Table 2.

TABLE 2

|  | Optical diffuse reflectance on light output side (%) | Optical diffuse reflectance on light input side (%) | Light blocking effect | Interference fringe | scintillation |
| --- | --- | --- | --- | --- | --- |
| No. 11 | 3.2 | 2.9 | ○ | ○ | ○ |
| No. 12 | 3.2 | 3.8 | ○ | ○ | ○ |
| No. 13 | 1.9 | 2.5 | ○ | ○ | ○ |
| No. 14 | 3.5 | 5.0 | ○ | ○ | ○ |
| No. 15 | 3.5 | 2.5 | ○ | ○ | ○ |
| No. 16 | 1.9 | 5.0 | ○ | ○ | ○ |
| No. 17 | 1.5 | 1.9 | ○ | x | x |
| No. 18 | 3.8 | 3.2 | x | ○ | ○ |

As is seen from Table 2, in the case where the optical diffuse reflectance on the light output surface side of the optical sheet is 1.9% to 3.5%, all of a light blocking effect, interference fringe and scintillation can be "good" according to Nos. 11 to 16.

In contrast, in the case where the optical diffuse reflectance on the light input surface side is 2.5% to 5.0%, all of a light blocking effect, interference fringe and scintillation can be "good" according to Nos. 11 to 16.

<Test C>

As Test C, laminates having optical sheets where the shapes of the cross sections of the light transmission parts and the light absorption parts etc. varied were made, to check their performances.

(No. 21)

Figure 17:
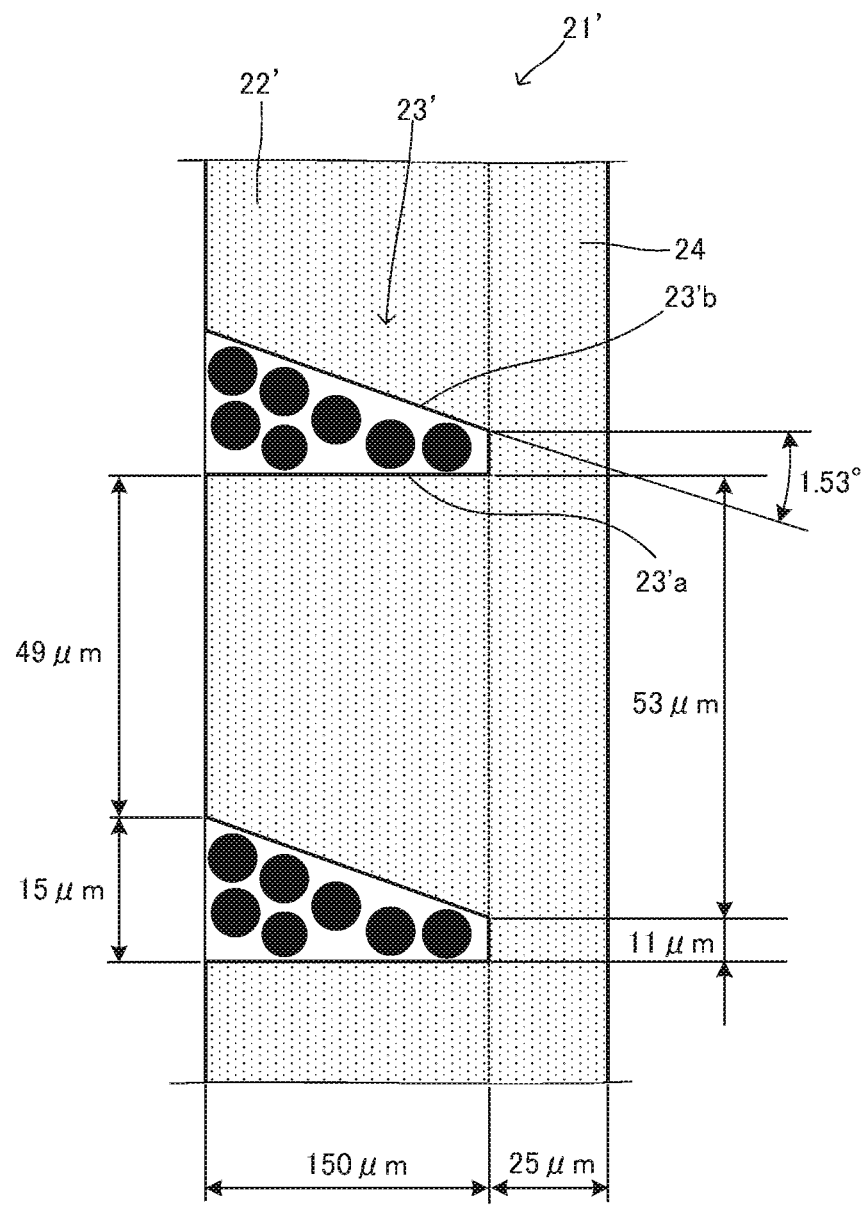
FIG. 17 is a view to explain an embodiment of an optical function layer No. 21.

In No. 21, a laminate that includes an optical function layer having a cross section shown in FIG. 17 was made. This laminate was formed of a substrate layer, the optical function layer, a reflective polarizing plate, and a layer having micro-roughness. The optical function layer and the reflective polarizing plate were integrated by an adhesive layer.

Further specifically, matte polycarbonate resin of 130 μm in thickness was used for the substrate layer. That is, a micro-roughness surface formed on a metal mold was copied on a surface of the substrate layer which was on the side opposite to the optical function layer, to form micro-roughness (matte surface).

UV-curable urethane acrylate of 1.56 in refractive index was used for the light transmission part 22' of the optical function layer. The cross section of the light transmission part 22' was a trapezoid of 49 μm in upper base, 53 μm in lower base and 150 μm in height.

UV-curable urethane acrylate of 1.49 in refractive index was used for the binder in the light absorption part 23' of the optical function layer. Acrylic beads containing carbon black was included in the binder so that the content thereof was 25 mass % on the basis of the whole of the composition constituting the light absorption part. The cross section of the light absorption part 23' was a trapezoid of 11 μm in upper base, 15 μm in lower base and 150 μm in height.

According to this, the cross-sectional area of the light transmission part was 79.7% of the total cross-sectional area of one adjacent light transmission part and light absorption part on a cross section of the optical function layer in the layer thickness direction.

One leg part of the light transmission part 22' (one leg part of the light absorption part) was parallel to the thickness direction of the optical function layer (parallel to the normal line direction of the light input surface of the optical function layer).

The linking part of the optical function layer was 25 μm in thickness (Tk in FIG. 3).

DBEF-D2-280 manufactured by 3M Company was used for the reflective polarizing plate.

The layer having micro-roughness was formed with a metal mold having a micro-roughness surface. Micro-roughness was adjusted so as to be within a range of 0.01 μm and 0.50 μm in Ra75 in JIS 13 0601-2001. Here, surface roughness was measured with Surface Texture Measuring Instrument SURFCOM (Model E-RM-S18B manufactured by TOKYO SEIMITSU CO., LTD.).

(No. 22)

Figure 18:
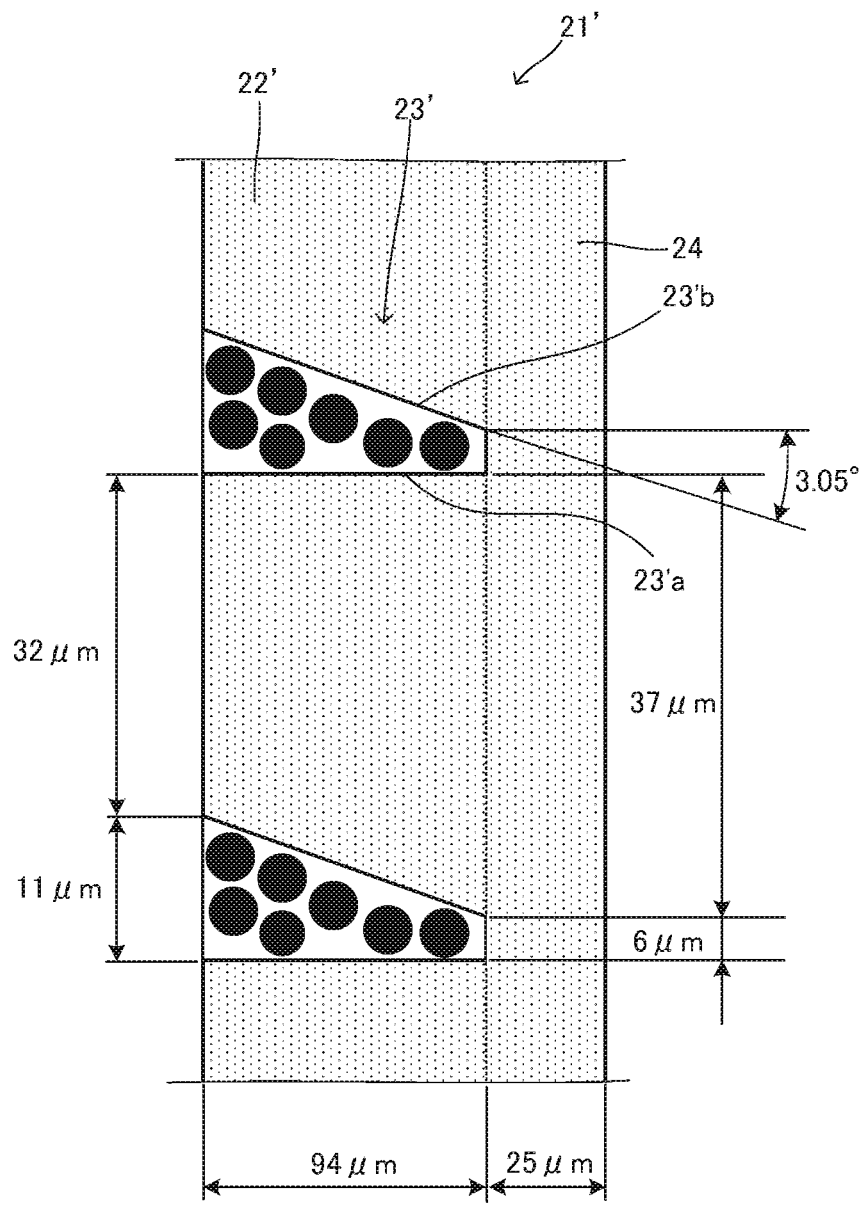
FIG. 18 is a view to explain an embodiment of an optical function layer No. 22.

In No. 22, the shapes of the light transmission parts and the light absorption parts were changed from No. 21 as shown in FIG. 18. Other details were the same as No. 21.

According to this, the cross-sectional area of the light transmission part was 80.2% of the total cross-sectional area of one adjacent light transmission part and light absorption part on a cross section of the optical function layer in the layer thickness direction.

(No. 23)

Figure 19:
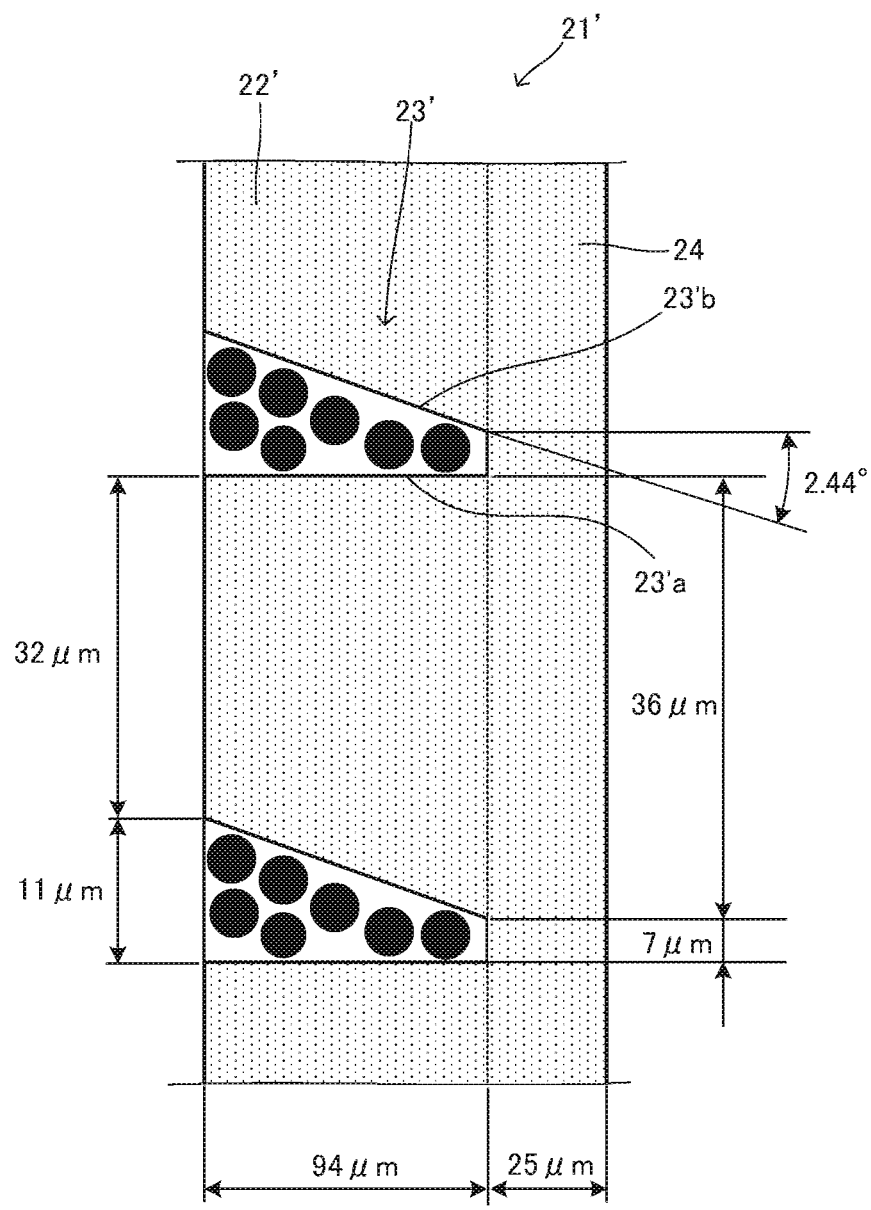
FIG. 19 is a view to explain an embodiment of an optical function layer No. 23.

In No. 23, the shapes of the light transmission parts and the light absorption parts were changed from No. 21 as shown in FIG. 19. Other details were the same as No. 21.

According to this, the cross-sectional area of the light transmission part was 79.1% of the total cross-sectional area of one adjacent light transmission part and light absorption part on a cross section of the optical function layer in the layer thickness direction.

(Nos. 24 and 25)

Figure 20:
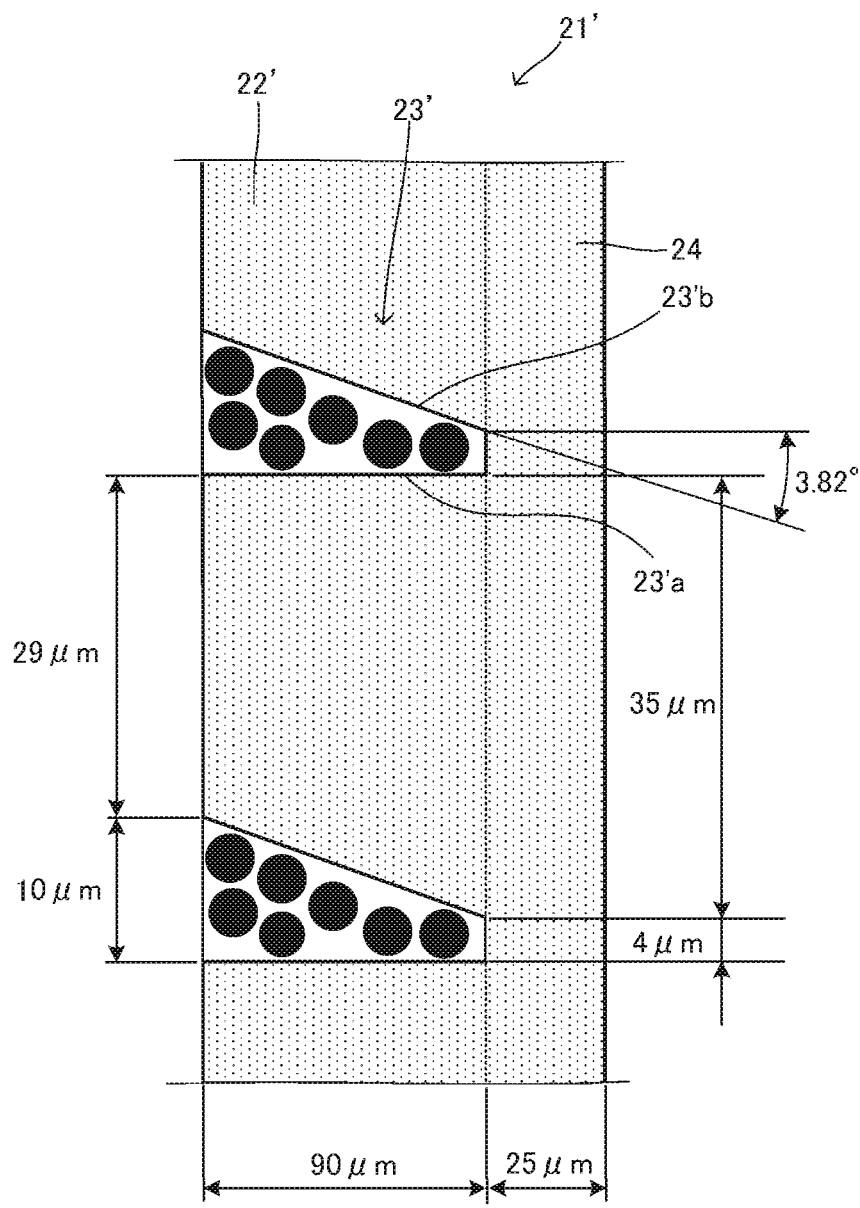
FIG. 20 is a view to explain an embodiment of optical function layers Nos. 24 and 25.

In Nos. 24 and 25, the shapes of the light transmission parts and the light absorption parts were changed from No. 21 as shown in FIG. 20. Other details were the same as No. 21.

According to this, the cross-sectional area of the light transmission part was 82.1% of the total cross-sectional area of one adjacent light transmission part and light absorption part on a cross section of the optical function layer in the layer thickness direction.

A liquid crystal display of 6.5-inch (LQ65T5GG03 manufactured by Sharp Corporation) was equipped with each of the laminates as the above, to be a liquid crystal display. More specifically, an optical sheet was arranged on the light output surface side of a surface light source device that consisted of a light guide plate on a side surface of which a light emission source was arranged, a prism sheet, a light diffusion film and a reflective polarizing plate; and a liquid crystal panel was arranged on the light output surface side of the optical sheet.

Figure 21A:
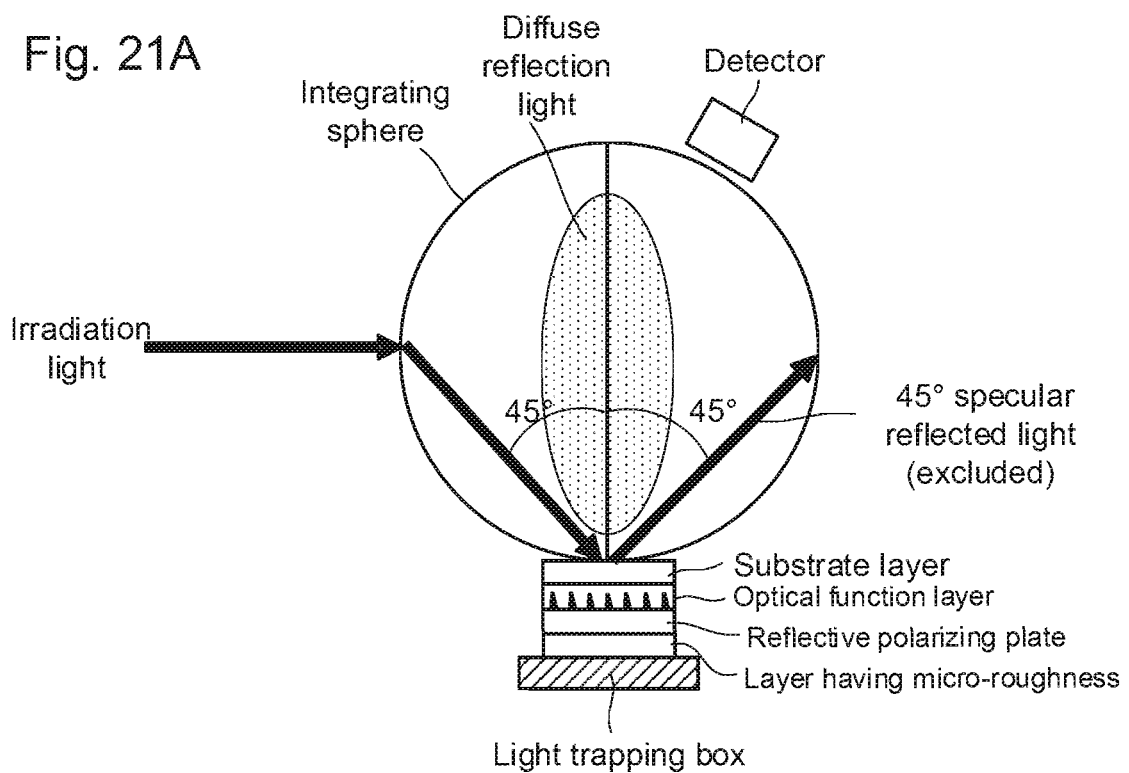
FIG. 21A is a view to explain measurement of an optical diffuse reflectance on the light output side in Test C.
Figure 21B:
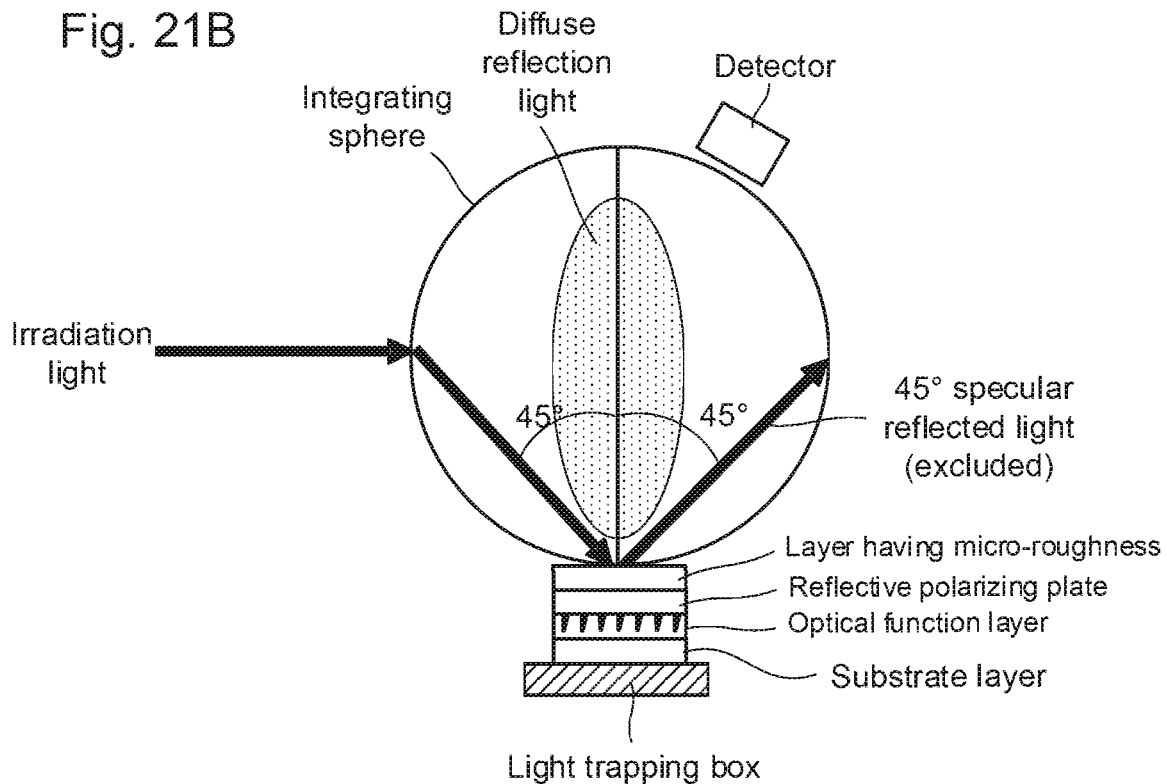
FIG. 21B is a view to explain measurement of an optical diffuse reflectance on the light input side in Test C.

In this test, as well as Test B, with reference to FIG. 21A (light output side) and FIG. 21B (light input side), irradiation light (light source D65) inclining at 45° from the normal line of the optical sheet (optical function layer) was irradiated to the optical sheet in a direction of aligning the light transmission parts and the light absorbing parts alternately, to obtain the optical diffuse reflectance on the light output and input sides. The results are shown in Table 3.

It is noted that one leg part of the trapezoidal cross section of the light absorbing part 23' which was parallel to the thickness direction was arranged so as to be directed toward the irradiation light in Nos. 21 to 24, and so as to be directed opposite thereto in No. 25.

TABLE 3

| | Optical diffuse reflectance on light output side (%) | Optical diffuse reflectance on light input side (%) | Light blocking effect | Interference fringe | scintillation |
|---|---|---|---|---|---|
| No. 21 | 2.0 | 9.8 | x | ○ | ○ |
| No. 22 | 2.1 | 10.7 | x | ○ | ○ |
| No. 23 | 2.2 | 8.2 | ○ | ○ | ○ |
| No. 24 | 2.0 | 9.4 | ○ | ○ | ○ |
| No. 25 | 2.0 | 9.7 | ○ | ○ | ○ |

As is seen from the results in Table 3, it is found that in the laminate where the reflective polarizing plate is arranged, more than 9.7% of the optical diffuse reflectance on the light input side raises a problem in a light blocking effect.

REFERENCE SIGNS LIST

1 image display device
5 image source unit
10 image source
11 surface light source device
12 liquid crystal panel
20 optical sheet
21 optical function layer
22 light transmission part
23 light absorption part
25 substrate layer

What is claimed is:

1. A laminate having a plurality of layers, the laminate comprising:
    a substrate layer including a rough surface on an output side of the laminate; and
    an optical function layer that is layered on a surface of the substrate layer opposite the rough surface, and has a plurality of light transmission parts which are arranged in a row along a surface of the substrate layer at predetermined intervals, the light transmission parts being light-transmissive, each of the light transmission parts having a predetermined cross section in a layer thickness direction, the light transmission parts extending in a direction across the optical function layer, and light absorption parts in a row, each of which is arranged between adjacent ones of the light transmission parts so as to be light-absorptive, the light absorption parts each having a second predetermined cross section in a layer thickness direction, the light absorption parts extending in said direction across the optical function layer; and
    wherein on a cross section of the optical function layer in a layer thickness direction, a cross-sectional area of one of the light transmission parts to a total cross-sectional area of one of the light transmission parts and one of the light absorption parts which are adjacent to each other is 78.2% to 88.5%, and
    when irradiation light inclining at 45° from a normal line of the optical function layer is irradiated in a direction of alternately aligning the light transmission parts and the light absorbing parts of the optical function layer, a light trapping box is arranged on an opposite side of the laminate, and omnidirectional light when 45° specular reflected light is excluded from reflected light of this irradiation light is defined as an optical diffuse reflectance, an optical diffuse reflectance on the light output surface side of the laminate is 1.9% to 3.5%.

2. The laminate according to claim 1, wherein an optical diffuse reflectance on a light input surface side of the laminate is 2.5% to 5.0%.

3. A laminate having a plurality of layers, the laminate comprising:
    a substrate layer;
    an optical function layer that is layered on one surface of the substrate layer, and has a plurality of light transmission parts which are arranged in a row along a surface of the substrate layer at predetermined intervals, the light transmission parts being light-transmissive, each of the light transmission parts having a predetermined cross section in a layer thickness direction, the light transmission parts extending in a direction across the optical function layer, and light absorption parts in a row, each of which is arranged between adjacent ones of the light transmission parts so as to be light-absorptive, the light absorption parts each having a second predetermined cross section in a layer thickness direction, the light absorption parts extending in said direction across the optical function layer; and
    a reflective polarizing plate that is arranged on the optical function layer on a side opposite to the substrate layer,
    wherein on a cross section of the optical function layer in a layer thickness direction, a cross-sectional area of one of the light transmission parts to a total cross-sectional area of one of the light transmission parts and one of the light absorption parts which are adjacent to each other is 78.2% to 88.5%, and
    when irradiation light inclining at 45° from a normal line of the optical function layer is irradiated in a direction of alternately aligning the light transmission parts and the light absorbing parts of the optical function layer, a light trapping box is arranged on an opposite side of the laminate and omnidirectional light when 45° specular reflected light is excluded from reflected light of this irradiation light is defined as an optical diffuse reflectance, an optical diffuse reflectance on the light input surface side of the laminate is 8.2% to 9.7%, wherein the laminate has a rough surface on a side facing the irradiation light.

4. The laminate according to claim 1, wherein the first predetermined cross section in the layer thickness direction is a trapezoid.

5. The laminate according to claim 3, wherein the first predetermined cross section in the layer thickness direction is a trapezoid.

6. An image source unit comprising a liquid crystal panel that is arranged on a light output side of the laminate according to claim 1.

7. An image source unit comprising a liquid crystal panel that is arranged on a light output side of the laminate according to claim 3.

8. An image display device comprising:
a housing; and
the image source unit according to claim 6 which is arranged inside the housing.

9. An image display device comprising:
a housing; and
the image source unit according to claim 7 which is arranged inside the housing.

10. The laminate according to claim 1, wherein the difference between a refractive index of each of the light transmission parts and a refractive index of each of the light absorption parts is no less than 0.05.

11. The laminate according to claim 3, wherein the difference between a refractive index of each of the light transmission parts and a refractive index of each of the light absorption parts is no less than 0.05.

12. The laminate according to claim 1, wherein a proportion of opening of the optical function layer is at least 71.8%.

13. The laminate according to claim 3, wherein a proportion of opening of the optical function layer is at least 71.8%.

14. The laminate according to claim 1, wherein the rough surface has an arithmetic mean roughness of between 0.1 μm to 0.2 μm as measured according to JIS B 0601.

15. The laminate according to claim 3, wherein the rough surface has an arithmetic mean roughness of between 0.1 μm to 0.2 μm as measured according to JIS B 0601.

\* \* \* \* \*